US012611727B2

(12) United States Patent
Akatsu et al.

(10) Patent No.: US 12,611,727 B2
(45) Date of Patent: Apr. 28, 2026

(54) PATTERN FORMING APPARATUS FOR BASE MATERIAL, PATTERN FORMING METHOD, BASE MATERIAL, AND CONTAINER

(71) Applicants: Kazuhiro Akatsu, Kanagawa (JP); Rie Hirayama, Kanagawa (JP); Kazuhiro Fujita, Tokyo (JP); Shoichiro Sakai, Kanagawa (JP)

(72) Inventors: Kazuhiro Akatsu, Kanagawa (JP); Rie Hirayama, Kanagawa (JP); Kazuhiro Fujita, Tokyo (JP); Shoichiro Sakai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 472 days.

(21) Appl. No.: 18/115,781

(22) Filed: Mar. 1, 2023

(65) Prior Publication Data

US 2023/0219162 A1 Jul. 13, 2023

Related U.S. Application Data

(63) Continuation of application No. PCT/JP2021/035158, filed on Sep. 24, 2021.

(30) Foreign Application Priority Data

| Sep. 30, 2020 | (JP) | 2020-165480 |
| Sep. 30, 2020 | (JP) | 2020-165955 |
| May 6, 2021 | (JP) | 2021-078553 |

(51) Int. Cl.
*B23K 26/00* (2014.01)
*B23K 26/082* (2014.01)
(Continued)

(52) U.S. Cl.
CPC ...... *B23K 26/0006* (2013.01); *B23K 26/0821* (2015.10); *B41M 5/267* (2013.01); *B41J 2/442* (2013.01); *B41J 2/475* (2013.01)

(58) Field of Classification Search
CPC . B41J 3/4073; B41J 2/475; B41J 2/455; B41J 2/442; B41J 2/47; B65D 85/32;
(Continued)

(56) References Cited

U.S. PATENT DOCUMENTS

2018/0333967 A1* 11/2018 Uetake .................... B41J 2/455
2022/0097414 A1 3/2022 Hirayama et al.
(Continued)

FOREIGN PATENT DOCUMENTS

DE 10 2011 050 569 A1 11/2012
JP H02-097984 8/1990
(Continued)

OTHER PUBLICATIONS

Notice of Submission of Publications issued Jun. 26, 2024 in Japanese Patent Application No. 2020-165955 with English translation thereof.
(Continued)

*Primary Examiner* — Thinh H Nguyen
(74) *Attorney, Agent, or Firm* — XSENSUS LLP

(57) ABSTRACT

A pattern forming apparatus for a base material includes a holding unit and a pattern forming unit. The holding unit is configured to hold a base material on which one of a protrusion shape portion and a recess shape portion is formed. The pattern forming unit is configured to form a pattern on the base material. The pattern is formed on at least one of the protrusion shape portion, the recess shape portion, a periphery of the recess shape portion, a periphery of the protrusion shape portion, a portion along the protrusion shape portion, and a portion along the recess shape portion.

20 Claims, 23 Drawing Sheets

(51) Int. Cl.
  B41M 5/26          (2006.01)
  *B41J 2/44*            (2006.01)
  *B41J 2/475*           (2006.01)

(58) Field of Classification Search
  CPC ........ B65D 61/02; B65D 1/02; B23K 26/032;
                    B23K 2103/42; B23K 26/36
  See application file for complete search history.

(56)                  References Cited

U.S. PATENT DOCUMENTS

| | | |
|---|---|---|
| 2022/0118553 A1 | 4/2022 | Miyanishi et al. |
| 2022/0410608 A1 | 12/2022 | Hirayama et al. |

FOREIGN PATENT DOCUMENTS

| | | |
|---|---|---|
| JP | H08-53121    A | 2/1996 |
| JP | HOB-053121     | 2/1996 |
| JP | 2002-362573  A | 12/2002 |
| JP | 2003-205375    | 7/2003 |
| JP | 2005-162272  A | 6/2005 |
| JP | 2009-262165    | 11/2009 |
| JP | 2011-005512  A | 1/2011 |
| JP | 2011-011819    | 1/2011 |
| JP | 4662482        | 3/2011 |
| JP | 2013-180416  A | 9/2013 |
| JP | 2016-123980    | 7/2016 |
| JP | 2019-112132  A | 7/2019 |
| JP | 2021-176648    | 11/2021 |
| JP | 2022-035976    | 3/2022 |
| WO | 2022/070756    | 4/2022 |

OTHER PUBLICATIONS

Press release dated Apr. 2, 2020 by The Coca-Cola Company (See Non-Patent Document No. 1 for concise explanation of the relevance).

International Search Report Issued Dec. 14, 2021 in PCT/JP2021/035158 filed Sep. 24, 2021, 7 pages.

Office Action issued Feb. 2, 2024 in Japanese Patent Application No. 2020-165955, 5 pages.

Office Action issued Jan. 21, 2025 in Japanese Patent Application No. 2021-078553, 8 pages.

Office Action issued Dec. 27, 2025 in Chinese Patent Application No. 202180077152.X, 21 pages.

\* cited by examiner

Fig. 2A
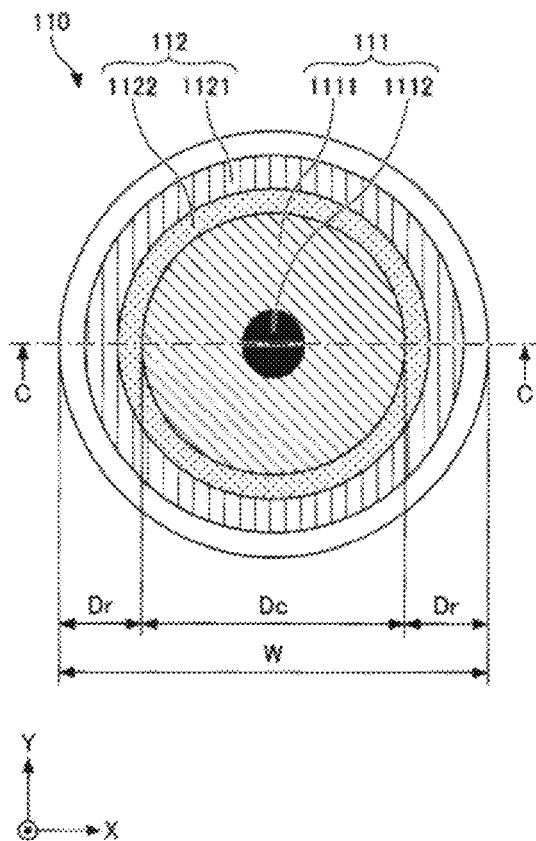
Fig. 2B
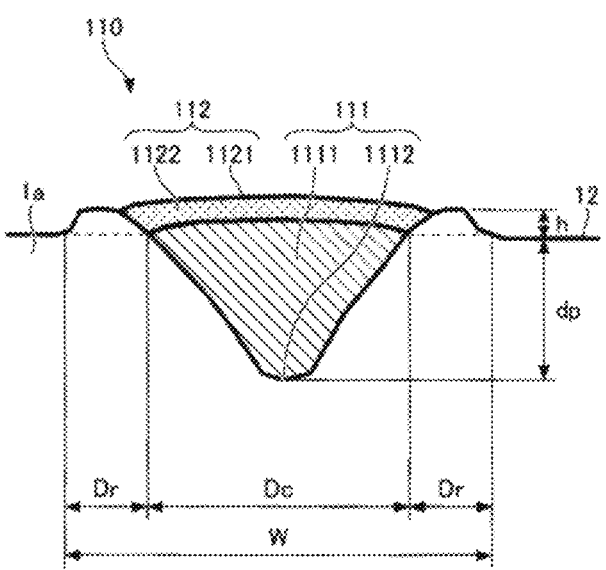
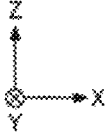

Fig. 3A
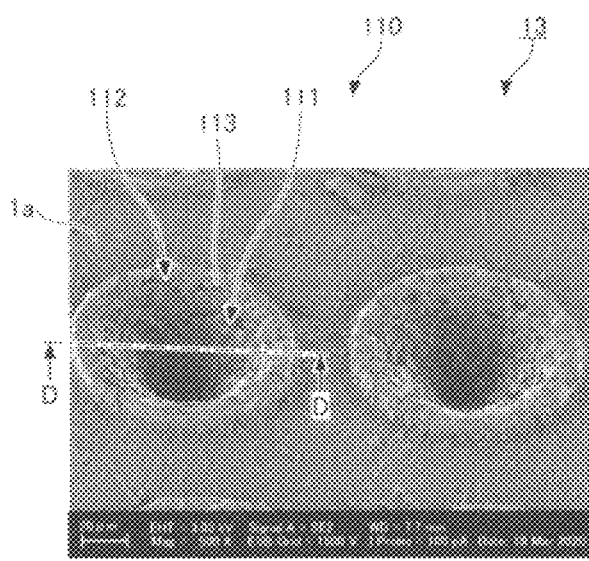
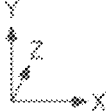
Fig. 3B
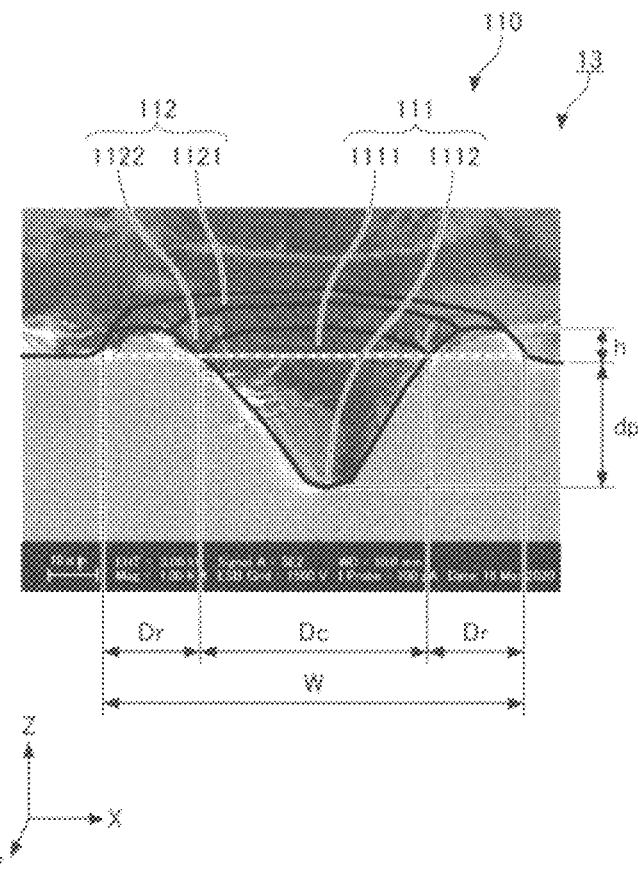

Fig. 9

| No | LASER PRINTING MODE | SETTING OF FOCAL POINT | LASER POWER |
|----|---------------------|------------------------|-------------|
| (1) | ONLY TOP PORTION | TOP PORTION | CONSTANT |
| (2) | ONLY SIDE PORTION | SIDE PORTION | CONSTANT |
| (3) | ONLY BOTTOM PORTION | BOTTOM PORTION | CONSTANT |
| (4) | TOP PORTION (THIN) AND BOTTOM PORTION (THICK) | TOP PORTION | HIGH OUTPUT POWER AT BOTTOM PORTION |
| (5) | TOP PORTION (THICK) AND BOTTOM PORTION (THIN) | BOTTOM PORTION | HIGH OUTPUT POWER AT TOP PORTION |
| (6) | TOP, BOTTOM, AND SIDE PORTIONS | SIDE PORTION | CONSTANT |

PATTERN FORMING APPARATUS FOR BASE MATERIAL, PATTERN FORMING METHOD, BASE MATERIAL, AND CONTAINER

CROSS-REFERENCE TO RELATED APPLICATIONS

The present application is a continuation application of International Application No. PCT/JP2021/035158, filed Sep. 24, 2021, which claims priority to Japanese Patent Application No. 2020-165480, filed Sep. 30, 2020, Japanese Patent Application No. 2020-165955, filed Sep. 30, 2020, and Japanese Patent Application No. 2021-078553, filed May 6, 2021. The contents of these applications are incorporated herein by reference in their entirety.

BACKGROUND OF THE INVENTION

1. Field of the Invention

The present invention relates to a pattern forming apparatus for a base material, a pattern forming method, a base material, and a container.

2. Description of the Related Art

Japanese Unexamined Patent Application Publication No. 2011-011819 discloses a configuration of a polyethylene terephthalate (PET) bottle that is made up of a cap and a bottle without using a label by displaying description items on a bottle 2 in the form of marking and printing based on direct thermal processing or in the form of marking and printing based on molding using a mold.

SUMMARY OF THE INVENTION

According to an aspect of the present invention, a pattern forming apparatus for a base material includes a holding unit and a pattern forming unit. The holding unit is configured to hold a base material on which one of a protrusion shape portion and a recess shape portion is formed. The pattern forming unit is configured to form a pattern on the base material. The pattern is formed on at least one of the protrusion shape portion, the recess shape portion, a periphery of the recess shape portion, a periphery of the protrusion shape portion, a portion along the protrusion shape portion, and a portion along the recess shape portion.

BRIEF DESCRIPTION OF THE DRAWINGS

FIG. 2A is a diagram illustrating a configuration example of a dot portion according to the present embodiment, which is a top view;

FIG. 2B is a diagram illustrating the configuration example of the dot portion according to the present embodiment, which is a cross-sectional view as viewed from an arrow C-C in FIG. 2A;

FIG. 3A is a picture of dot portions according to the present embodiment taken by a scanning electron microscope, and is a perspective view as viewed from above;

FIG. 3B is a picture of the dot portions according to the present embodiment taken by the scanning electron microscope, which is a perspective view as viewed from a cross-sectional direction of an arrow D-D in FIG. 3A;

FIG. 9 is a diagram for explaining setting of the focal point and power of the laser light according to the present embodiment;

FIG. 21 is a diagram illustrating an eighth modification of the container according to the present embodiment;

FIG. 24 is a diagram illustrating an eleventh modification of the container according to the present embodiment.

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
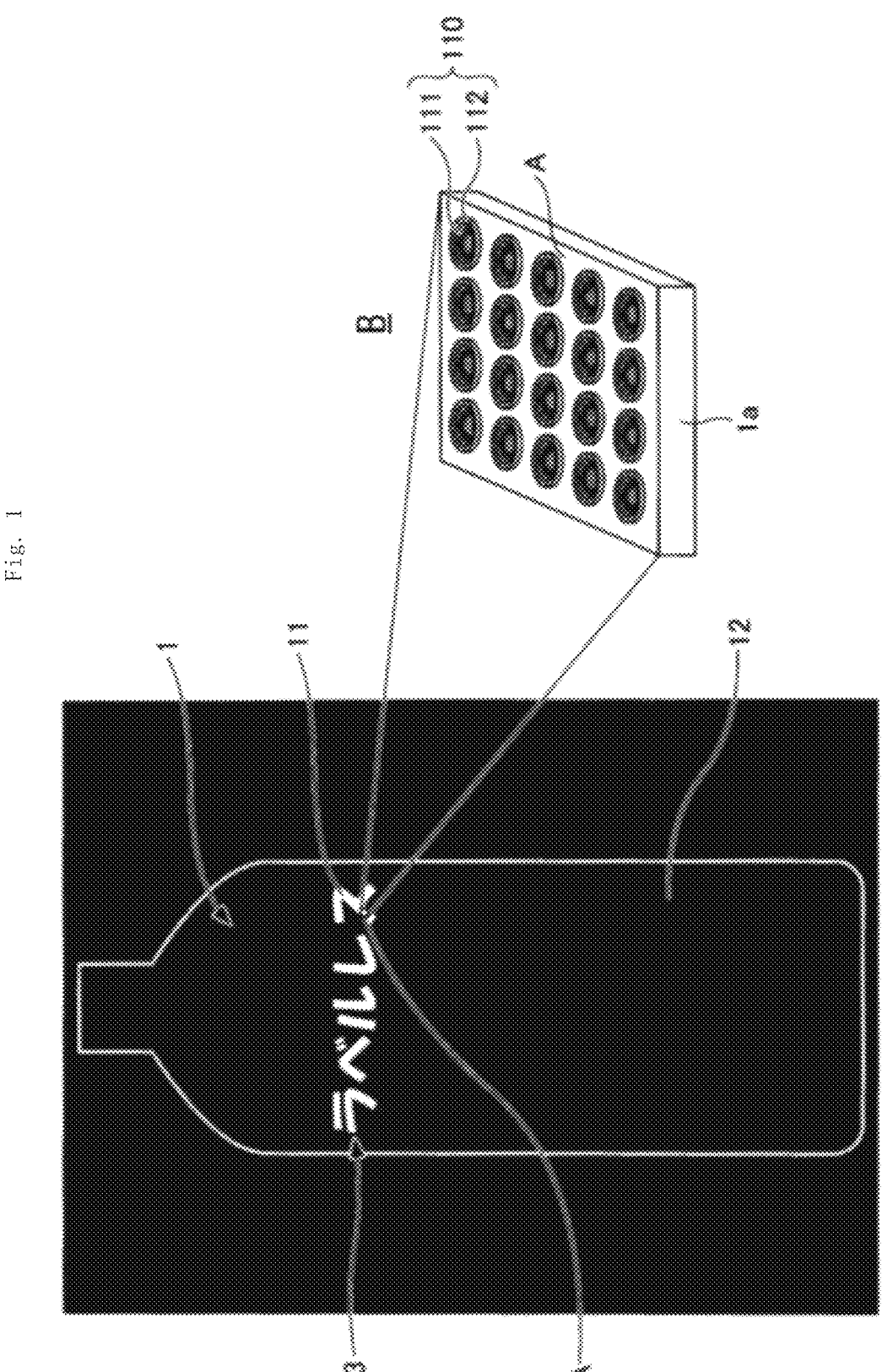
FIG. 1 is a diagram illustrating an example of a predetermined shape according to an embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment has an object to provide a base material with good visibility and with good design quality.

Modes for carrying out the present invention will be described below with reference to the drawings. In each of the drawings, the same components are denoted by the same reference symbols, and repeated explanation may be omitted. In addition, the embodiments described below illustrate an apparatus that implements the technical idea of the present invention, and the present invention is not limited to the embodiments described below. Dimensions, materials, shapes, relative positions, and the like of the components described below are illustrated by way of example and not intended to limit the scope of the present invention unless otherwise specified. Furthermore, sizes, positional relationships, and the like of members illustrated in the drawings may be exaggerated for the sake of clarity of description.

A base material according to one embodiment of the present invention is a base material in which a predetermined shape that constitutes a pattern is formed in at least a partial region. The base material means a material portion of an object. Examples of the object include a container. Examples of the container include a polyethylene terephthalate (PET) bottle that is made of a material including resin, such as PET, and that contains a beverage. However, the object is not specifically limited, and any object may be applicable. A shape and a material of the container are not specifically limited, and the container may have any shape and may be made of any material.

"At least the partial region" of the base material includes a region on a surface of the base material. The surface of the base material means a surface of the material that is exposed to outside air. In the embodiments, a phrase of "the surface of the base material" is used as a relative phrase of an internal portion of the base material; therefore, for example, in the case of a plate-shaped base material, both of a front surface and a back surface of the base material correspond to the surface of the base material. Further, in the case of a tubular base material, both of an outer surface and an inner surface of the base material correspond to the surface of the base material.

The pattern includes a character, a code, such as a barcode, a graphic, an image, and the like, and displays information, such as a name, an identification number, a manufacturer, and a manufacturing date and time, on the container or contents, such as a beverage, that is contained in the container, for example.

In the case of the container, such as a PET bottle, the above-described information may be displayed by attaching a recording medium on which the above-described information is recorded onto the surface of the container; however, in the embodiments, by forming a pattern representing the above-described information on the surface of the base material that constitutes the container, the above-described information is displayed without using the recording medium.

FIG. 1 is a diagram for explaining an example of a predetermined shape that is formed on a base material according to the present embodiment. FIG. 1 illustrates a part of a base material 1a that constitutes a container 1 with a surface on which a pattern 11 is formed. The container 1 and a contents constitute a containing body. The container 1 is configured with, as one example, the base material 1a that is made of PET resin having transparency to visible light. Meanwhile, the visible light is light having wavelengths in the range of about 360 nanometers (nm) to about 400 nm in a short-wavelength band and having wavelengths in the range of about 760 nm to about 1600 nm in a long-wavelength band.

The pattern 11 includes, as one example, a character string of "labelless" in katakana. A region A is a partial region of a character "s" in katakana in the pattern 11. A perspective view B is an enlarged schematic view of the region A for explaining details of the configuration of the pattern 11.

As illustrated in the perspective view B, the region A includes a plurality of dot portions 110. The dot portions 110 are formed in at least a partial region of the base material, and are illustrated as one example of the predetermined shapes that constitute the pattern. Meanwhile, the predetermined shape includes a shape that is formed on the surface of the base material, and an inner shape, such as an air space portion, that is present under the shape formed on the surface of the base material.

Each of the dot portions 110 is, as one visual example, a slightly opaque portion and includes a recess 111 and a protrusion 112. The recess 111 is a portion that is recessed from the surface of the base material 1a that constitutes the container 1, and is one example of a predetermined recess. The protrusion 112 is a portion that protrudes from the surface of the base material 1a that constitutes the container 1, and is one example of a predetermined protrusion. The protrusion 112 is formed around the recess 111 so as to enclose the recess 111.

The plurality of dot portions 110 are formed as an aggregation on the base material 1a that constitutes the container 1, and forms the character string of "labelless" in the pattern 11. Here, the aggregation indicates what is formed by aggregating individual entities, and the pattern 11 is formed of an aggregation of the plurality of dot portions 110.

In the base material 1a, a pattern region 13 in which the pattern 11 including the plurality of dot portions 110 is formed corresponds to a first region. Further, a non-pattern region 12 other than the first region in the base material 1a corresponds to a second region.

In the pattern region 13, because the plurality of dot portions 110 are formed, a reflection direction and optical diffusion of light that enters the container 1 are different from those in the non-pattern region 12. Therefore, at least one of optical transmittance and optical reflectance of light that enters the container 1 is different between the pattern region 13 and the non-pattern region 12. Due to the difference in at least one of the optical transmittance and the optical reflectance, a person who views the container 1 is able to view the pattern 11 formed on the container 1.

Further, an entire width (dot width) of each of the dot portions 110 and an interval (dot interval) between the dot portions 110 are small relative to the pattern 11. Therefore, a person who views the container 1 is able to view the characters of "labelless" in the pattern 11 without visually recognizing the dot portions 110.

An inter-dot gap that can prevent the dot portions 110 from being visually recognized varies depending on a visual acuity of a person who views the container 1, a distance between eyes and the container 1, or the like, but it is preferable to set the gap to 100 micrometers (μm) or less. Further, although it is ideal to reduce the dot width as much as possible, a preferable dot width is about 100 μm or less as a preferable size with which the shapes of the dot portions are not distinguishable. This will be described in detail below.

If a person with 6/4 vision views the container 1 at a distance of about 30 centimeters (cm), the person is generally able to recognize a black-and-white point (dot) with a size of 50 μm. This limit value increases with a decrease in contrast between black and white, but is generally about 50 μm. However, a dot with a size of 30 μm may be viewed if only the dot is present, and in some cases, a dot with a size of 10 μm may be viewed if the dot has high contrast.

Furthermore, if the two dot portions 110 are present in an adjacent manner, whether the two dot portions 110 can be viewed depends on resolution of the human eye or the like. Meanwhile, the resolution is a minimum distance at which two points can be recognized as two separate points.

The resolution of the human eye is generally 100 μm at a distance of 30 cm, although it depends on a visual acuity. 30 cm corresponds to a distance at which the person views information, such as a label, displayed on a PET bottle when the person picks up the PET bottle containing drinking water or the like in his/her hand. In other words, if the person picks up the PET bottle while slightly flexing an elbow, an interval between the eyes of the person and the PET bottle is about 30 cm. The distance varies in a range from 30 cm to 50 cm by taking into account a physical size of the person. The resolution is about 100 μm at the distance of 30 cm, and about 160 μm at the distance of 50 cm.

Further, as another index, when 200 dots per inch (dpi) is ensured as a boundary of the resolution, and if the gap between the adjacent dots is 130 μm or less, the dots are viewed as a unity, instead of being viewed separately from one another.

As described above, by preferably setting the gap between the dots to 160 μm or less, or more preferably setting the gap to 100 μm or less, the dot portions 110 are viewed as a continuous body instead of being viewed as separate dots, so that it is possible to view a pattern, such as the characters of "labelless", in the pattern 11. Furthermore, if the size of the dot is larger than 100 μm, shape changes of the dots may be visually recognized. Therefore, by preferably setting the dot size to 160 μm or less, or more preferably setting the dot size to 100 μm or less, even if the shapes of the dots are changed, it is possible to perceive the dots as a uniform pattern, so that it is possible to view a pattern, such as a character, that is an aggregation of the dots as a uniform pattern without graininess.

To form the dot portions 110, various machining methods, such as laser machining, electric spark machining, etching, cutting machining, or a molding machining using a mold, may be applied. Among the machining methods as described above, the laser machining method is preferable because it is possible to machine the base material in a non-contact manner, and it is possible to perform machining at a high speed by using laser light scanning, a light source array, pattern exposure, or the like.

In the laser machining, it is possible to change the sizes, the shapes, the depths, or the like of the dot portions 110 by adjusting optical energy of laser light (laser beam) to be emitted, a size of the laser beam, or an irradiation time, for example. Further, a cross-sectional strength distribution of the laser beam is generally a Gaussian distribution, but it is possible to generate a strength distribution in a top hat form in which a center of the strength distribution is flat, by adjusting the strength distribution by a combination of laser beams from an array light source or by designing an irradiation optical system.

The recess 111 in each of the dot portions 110 is formed by melting, burning, vaporizing, or deforming a part of the base material 1a at a laser light irradiation position. The protrusion 112 is formed such that a part of the base material 1a that is broken up from the recess 111 adheres to and is solidified in the vicinity of the recess 111 without being burned out or vaporized. This processing mainly uses thermal energy, and therefore, it is preferable to adopt resin or the like with relatively low thermal conductivity as a material of the base material 1a; however, the processing may be applied to other materials, such as glass.

Furthermore, by controlling thermal conductivity, it is possible to form various predetermined shapes, such as the dot portions 110. To control thermal conductivity, for example, it may be possible to adopt a material with high thermal conductivity as the base material 1a, or it may be possible to firmly attach a different material with high thermal conductivity to the base material 1a in order to rapidly transfer heat that is generated by the base material 1a due to irradiation with the laser light. Examples of the different material with high thermal conductivity include a cooling liquid and a metal.

Moreover, a phenomenon, such as melting, evaporation, crystallization, or foaming, in the laser machining irregularly occurs in an irradiation region, so that a surface of the pattern region 13 may get rough, and surface roughness of the pattern region 13 is likely to increase relative to the non-pattern region 12. With an increase in the surface roughness, in the pattern region 13, the optical diffusion with respect to light that enters the container 1 increases relative to the non-pattern region 12. As a result, the contrast of the pattern 11 is increased and visibility of the pattern 11 is further increased. In this point, the laser machining is more preferable.

Furthermore, in the present embodiment, the pattern is formed of the aggregation of the plurality of dot portions 110 each including at least one of the recess 111 and the protrusion 112, so that a surface area is increased along the shapes of the recesses 111 and the protrusions 112 and a region with large surface roughness is further increased as compared to a pattern that is formed of a bundle of grooves and hollows. Moreover, the pattern is formed of the aggregation of the plurality of dot portions 110, so that the surface area is further increased along the shapes of the plurality of dot portions 110. Accordingly, the optical diffusion is further increased, so that the contrast is increased and the visibility is further improved.

Meanwhile, in the example illustrated in the perspective view B, the dot portions 110 are formed by being regularly arranged in a square-lattice shape, but embodiments are not limited to this example. The dot portions may be formed by being arranged in a triangular-lattice shape or a honeycomb shape, or may be formed irregularly such that arrangement intervals are different from one another instead of being regularly arranged.

Furthermore, while the pattern 11 including the character string of "labelless" is illustrated, embodiments are not limited to this example. The pattern 11 may include an arbitrary character string, a graphic, a photograph, a symbol, a code, such as a barcode or a QR code, or a combination of the character string, the graphic, the photograph, the symbol, and the code. In other words, the pattern 11 is an image, and the image is formed by the predetermined shapes, such as the dot portions 110.

Configuration Example of Dot Portion 110

FIGS. 2A and 2B are diagrams for explaining an example of a configuration of the dot portion 110 according to the present embodiment, where FIG. 2A is a top view and FIG. 2B is a cross-sectional view as viewed from an arrow C-C in FIG. 2A. FIGS. 3A and 3B are pictures of the dot portions 110 according to the present embodiment taken by a scanning electron microscope (SEM), where FIG. 3A is a perspective view as viewed from above and FIG. 3B is a perspective view as viewed from a cross-sectional direction of an arrow D-D in FIG. 3A. FIGS. 3A and 3B illustrate an SEM pictures in which a part of the pattern region 13 is observed in an enlarged manner. In FIG. 3A, two of the dot portions 110 are entirely observed, parts of other two of the dot portions 110 are slightly observed in the positive Y-axis direction, and parts of other two of the dot portions 110 are slightly observed in the negative Y-axis direction. Furthermore, the dot width is set to about 100 μm.

As illustrated in FIGS. 2A to 3B, each of the dot portions 110 includes the recess 111 and the protrusion 112. The recess 111 includes a first inclined surface 1111 (diagonal line hatching portion) and a bottom portion 1112 (black portion), and is formed in a cup shape. A recess width Dc represents a width of the recess 111, and a depth dp represents a height of the bottom portion 1112 with respect to the surface of the non-pattern region 12 (length in the Z-axis direction).

Further, the protrusion 112 includes a top portion 1121 (vertical line hatching portion) and a second inclined surface 1122 (pear-skin hatching portion), and is formed in a torus shape. Meanwhile, the torus shape is a surface of revolution generated by revolving a circle. A torus width Dr represents a width of a torus portion of the protrusion 112 in a radial direction, and a height h represents a height of the top portion 1121 with respect to the surface of the non-pattern region 12 (length in the Z-axis direction).

The dot width W represents an entire width of the dot portion 110. The first inclined surface 1111 and the second inclined surface 1122 are continuous surfaces. The continuous surfaces indicate surfaces that are made of the same material and continued without any stepped portion.

Furthermore, as illustrated in FIGS. 3A and 3B, a micro asperity portion 113 is formed on a surface of each of the recess 111 and the protrusion 112, and the surface gets rough. The asperity portion 113 is one example of an asperity portion including a recess and a protrusion that are smaller than the predetermined shape. The asperity portion 113 includes a recess and a protrusion with widths that are smaller than the dot width W of the dot portion 110, and typically includes a recess and a protrusion with widths of about 1 μm to 10 μm.

Moreover, as illustrated in FIG. 3A, machining chips that are generated at the time of machining the dot portions 110 are scattered in each of regions between the dot portions 110, and surfaces get rough due to the machining chips. In the pattern region 13, the surfaces get rough due to the asperity portion 113 and the machining chips, so that the surface roughness is increased as compared to the non-pattern region.

The dot portions 110 can be formed by, for example, irradiating the base material 1a with laser light and denaturalizing the surface of the base material 1a. The single dot portion 110 is formed by collecting laser light onto a single point on the base material 1a. Furthermore, the plurality of dot portions 110 are formed by performing two-dimensional scanning using the laser light. Alternatively, the plurality of dot portions may be formed by a plurality of pieces of laser light emitted from a plurality of laser light sources that are arranged as an array. Moreover, it may be possible to form the plurality of dot portions 110 in a parallel manner by single exposure by irradiating a mask member, which has a plurality of light transmission openings corresponding to positions of the respective dot portions 110, with expanded laser light, and applying a group of a plurality of pieces of transmitted laser light that have transmitted through the light transmission openings of the mask member.

As a laser light source that emits laser light, various laser light sources are applicable. It is preferable to use a laser light source capable of performing pulsed oscillation at picosecond to nanosecond time scales. Examples of a solid-state laser include YAG lasers and titanium-sapphire lasers. Examples of a gas laser include argon lasers, helium neon lasers, and carbon dioxide lasers. A semiconductor laser is also preferable because it is small. Furthermore, a fiber laser which is one kind of solid-state lasers and in which an optical fiber is used as an amplifying medium is a most optimal light source in terms of having high peak energy and having a potential to be reduced in size.

Figure 4:
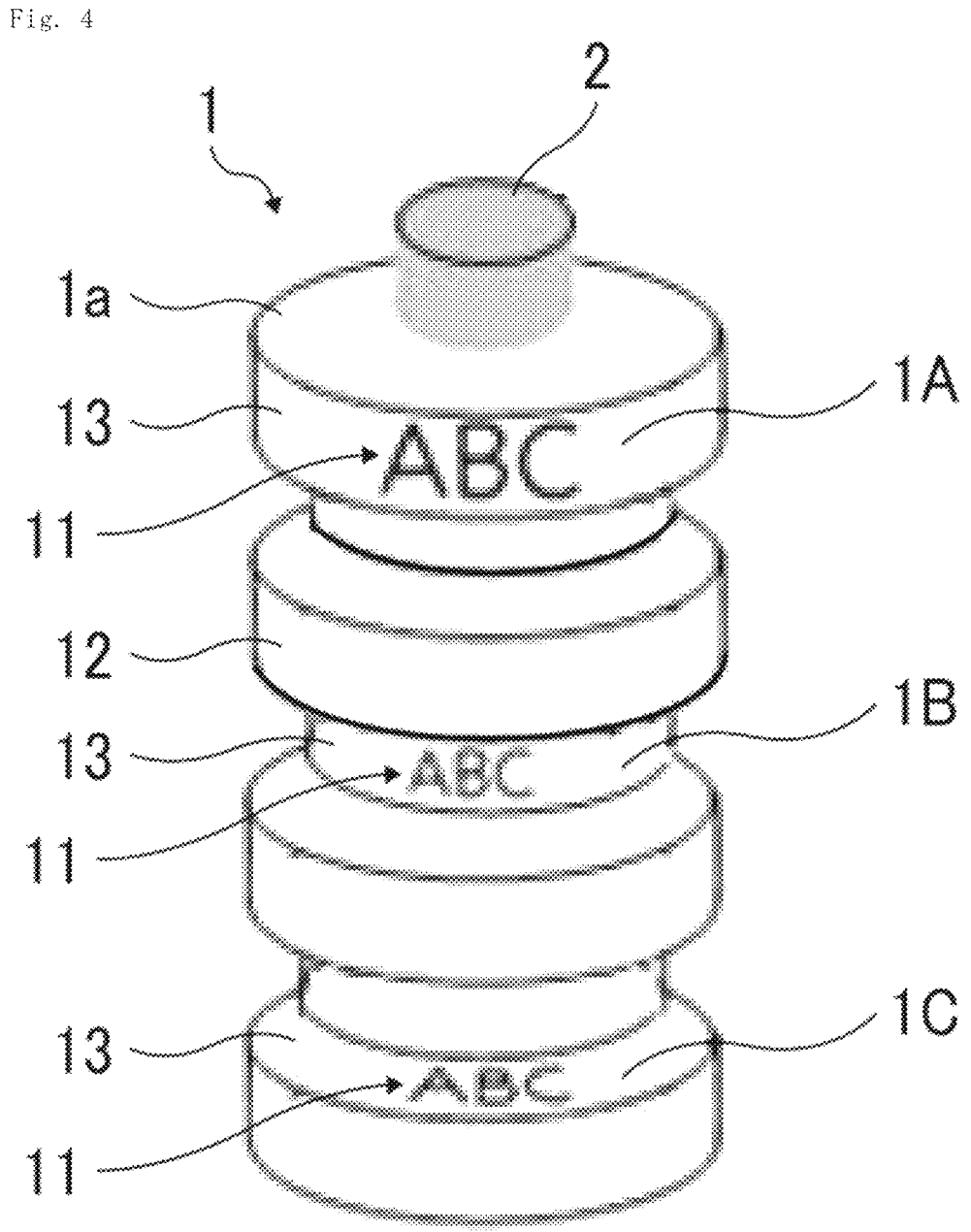
FIG. 4 is a diagram illustrating a specific example of a container according to the present embodiment.

FIG. 4 is a diagram illustrating a specific example of the container according to the present embodiment. In recent years, a PET bottle and the like are increasingly made thinner in order to reduce use of plastic along with a trend of reducing plastic waste. If the bottle is made thinner, strength of the bottle is reduced; therefore, there is a known technique for forming a rib by forming protrusion shape and recess shape portions in a lateral direction in order to increase rigidity. In addition, in some cases, ribs having various shapes may be formed in order to improve a light blocking effect or design quality.

Ribs having recess-protrusion shapes are formed on the base material 1*a* of the container 1 illustrated in FIG. 4. Specifically, the container 1 includes top portions 1A having protrusion shapes, bottom portions 1B having recess shapes, and side portions 1C having recess shapes. The side portions 1C having the recess shapes are also referred to as the side portions 1C having the protrusion shapes if the bottom portions 1B having the recess shapes are used as reference surfaces.

The container 1 includes the plurality of top portions 1A, where one of the top portions 1A serves as the pattern region 13 in which the pattern 11 is formed and the other top portions 1A serve as the non-pattern regions 12 in which the patterns 11 are not formed.

The container 1 includes the plurality of bottom portions 1B, where one of the bottom portions 1B serves as the pattern region 13 in which the pattern 11 is formed and the other bottom portions 1B serve as the non-pattern regions 12 in which the patterns 11 are not formed.

The container 1 includes the plurality of side portions 1C, where one of the side portions 1C serves as the pattern region 13 in which the pattern 11 is formed and the other side portions 1C serve as the non-pattern regions 12 in which the patterns 11 are not formed.

In FIG. 4, the ribs that have the recess-protrusion shapes and that are formed on the base material 1*a* are formed in the lateral direction, but may be formed in a vertical direction, an oblique direction, or a combinational direction of the above-described directions.

Figure 5:
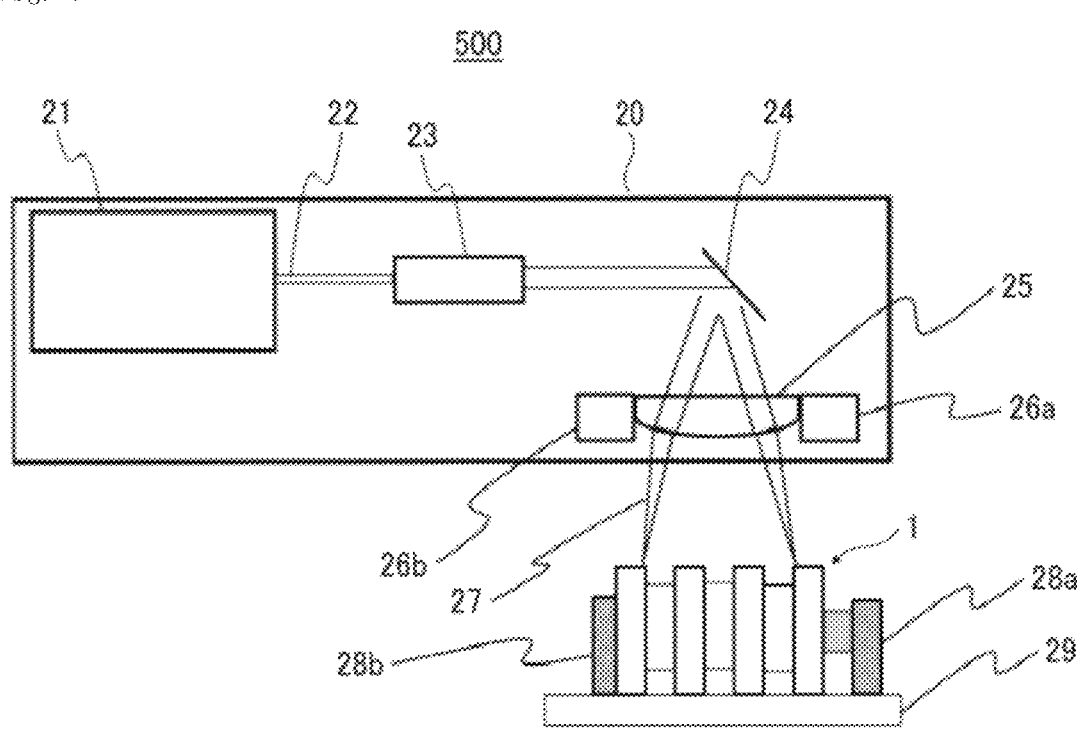
FIG. 5 is a diagram illustrating a manufacturing apparatus according to the present embodiment.

FIG. 5 is a diagram illustrating the manufacturing apparatus according to the present embodiment. A manufacturing apparatus 500 for the container 1 including the base material 1*a* includes a laser irradiation unit 20 as one example of a pattern forming unit that forms the pattern 11, holding units 28*a* and 28*b* that hold the container 1 including the base material 1*a*, and a holding plate 29 that holds the holding units 28*a* and 28*b*. A manufacturing apparatus 100 is one example of a pattern forming apparatus, an information forming apparatus, and a laser machining apparatus. The manufacturing apparatus 100 is incorporated in an apparatus for manufacturing the container 1 or a containing body in a factory, and is included in one process that is determined in the flow of a manufacturing line of the container 1 or the containing body.

The laser irradiation unit 20 includes a laser light source 21, a beam expander 23, a scanning unit 24 that performs scanning with light by using a mirror or the like, a scanning lens 25, and stereo cameras 26*a* and 26*b*.

The beam expander 23 receives laser light 22 emitted from the laser light source 21, and changes a focal position of laser light 27 that is applied to the base material 1*a*.

The stereo cameras 26*a* and 26*b* are one example of a position detection unit that detects a position of a protrusion shape portion or a recess shape portion of the base material 1*a*, and are also one example of a distance detection unit that detects a distance to the protrusion shape portion or the recess shape portion of the base material 1*a*. The laser irradiation unit 20 controls energy, a beam diameter, or a focal position of the laser light 27 on the basis of distance measurement data of the protrusion shape portion or the recess shape portion of the base material 1*a* detected by the stereo cameras 26*a* and 26*b*. The laser irradiation unit 20 may take into account a continuous width (size) of the top portion 1A, the bottom portion 1B, and the side portion 1C, and control the energy, the beam diameter, or the focal position of the laser light 27 in accordance with a wide width portion of the top portion 1A, the bottom portion 1B, and the side portion 1C that are adjacent to one another in an irradiation region of the laser light 27. Further, if the laser irradiation unit 20 applies laser across two or more of the top portion 1A, the bottom portion 1B, and the side portion 1C, it may be possible to control the energy, the beam diameter, or the focal position of the laser light 27 on the basis of distance measurement data of a portion in which laser irradiation is started or a portion in which laser irradiation is terminated.

Figure 6A:
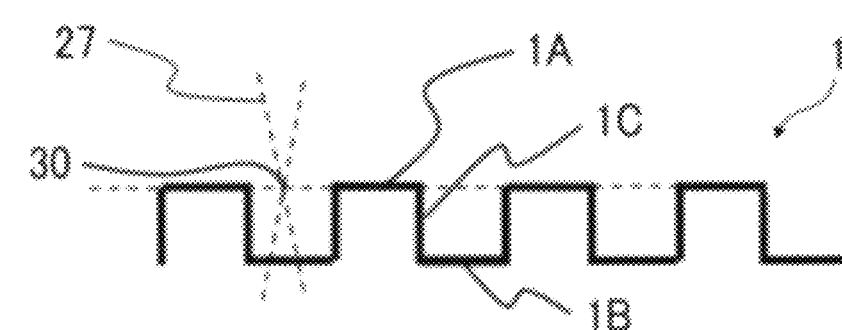
FIG. 6A is a diagram for explaining a focal point of laser light according to the present embodiment.
Figure 6B:
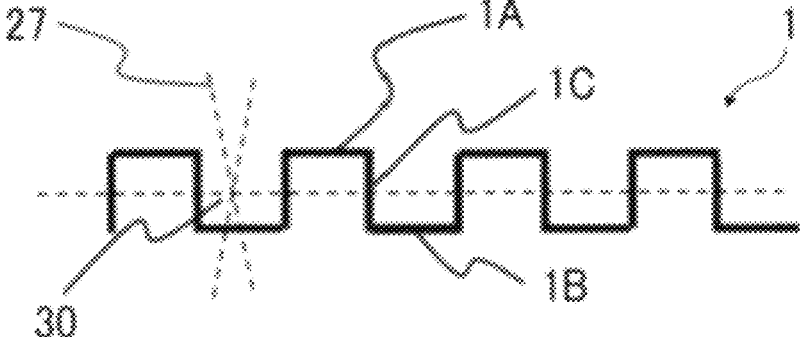
FIG. 6B is a diagram for explaining a focal point of laser light according to the present embodiment.
Figure 6C:
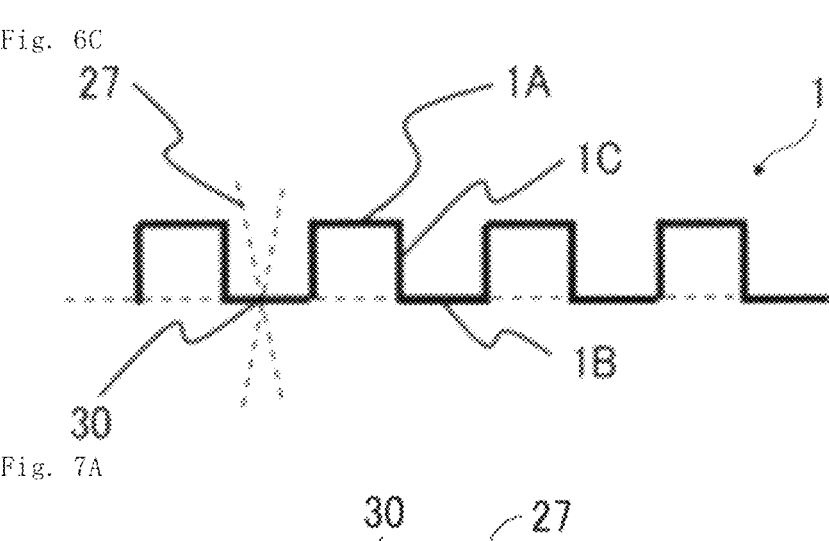
FIG. 6C is a diagram for explaining a focal point of laser light according to the present embodiment.

FIGS. 6A to 6C are diagrams for explaining a focal point of laser light according to the present embodiment. FIG. 6A illustrates a state in which a focal position 30 of the laser light 27 applied to the base material 1*a* is located in the vicinity of the top portion 1A.

FIG. 6B illustrates a state in which the focal position 30 of the laser light 27 applied to the base material 1*a* is located between the top portion 1A and the bottom portion 1B, that is, in the vicinity of the side portion 1C.

FIG. 6C illustrates a state in which the focal position 30 of the laser light 27 applied to the base material 1*a* is located in the vicinity of the bottom portion 1B.

Figure 7A:
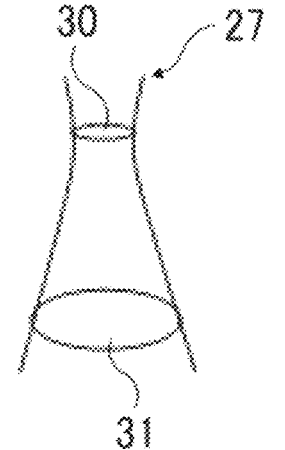
FIG. 7A is a diagram for explaining a spot diameter of the laser light according to the present embodiment.
Figure 7B:
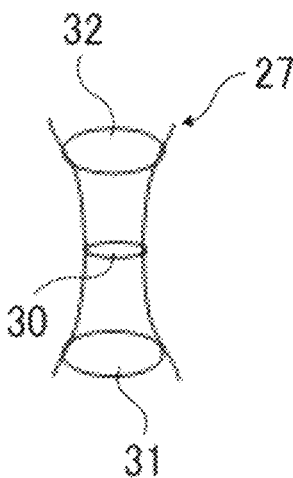
FIG. 7B is a diagram for explaining a spot diameter of the laser light according to the present embodiment.
Figure 7C:
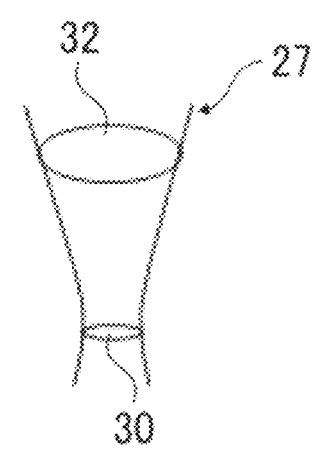
FIG. 7C is a diagram for explaining a spot diameter of the laser light according to the present embodiment.

FIGS. 7A to 7C are diagrams for explaining a spot diameter of the laser light according to the present embodiment. FIG. 7A illustrates a spot diameter in the state illustrated in FIG. 6A, where a spot diameter 31 in the vicinity of the bottom portion 1B is increased because the spot diameter 31 is located away from the focal position 30.

FIG. 7B illustrates the spot diameter in the state illustrated in FIG. 6B, where the spot diameter 31 in the vicinity of the bottom portion 1B is reduced as compared to the state illustrated in FIG. 7A.

FIG. 7C illustrates the spot diameter in the state illustrated in FIG. 6C, where a spot diameter 32 in the vicinity of the top portion 1A is increased as compared to the state as illustrated in FIG. 7B because the spot diameter 32 is located away from the focal position 30.

Figure 8A:
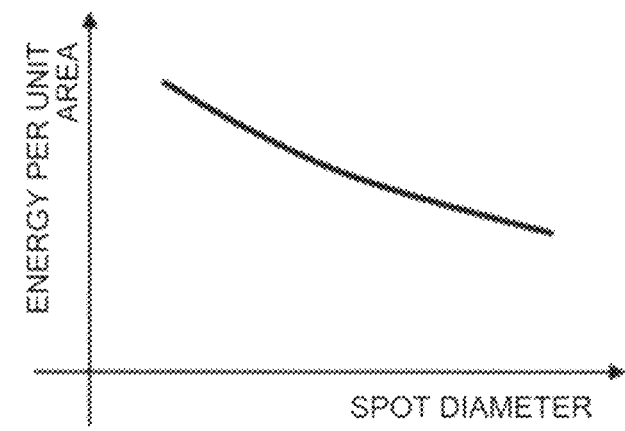
FIG. 8A is a diagram for explaining characteristics of the spot diameter of the laser light according to the present embodiment.
Figure 8B:
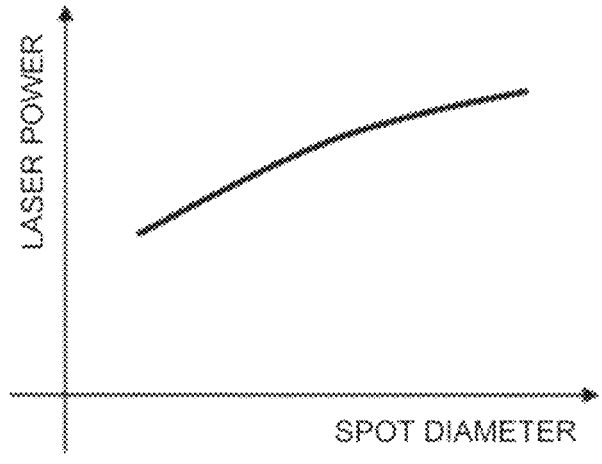
FIG. 8B is a diagram for explaining the characteristics of the spot diameter of the laser light according to the present embodiment.
Figure 8C:
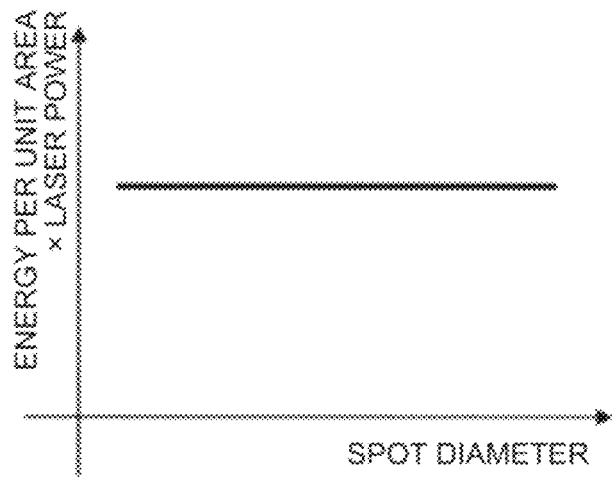
FIG. 8C is a diagram for explaining the characteristics of the spot diameter of the laser light according to the present embodiment.

FIGS. 8A to 8C are diagrams for explaining characteristics of the spot diameter of the laser light according to the present embodiment. FIG. 8A illustrates a relationship between the spot diameter and energy per unit area, and illustrates a relationship in which the spot diameter increases and the energy per unit area decreases with an increase in a distance from the focal position.

FIG. 8B illustrates a relationship between the spot diameter and laser power according to the present embodiment. In the present embodiment, the laser light source 21 is controlled such that the laser power is increased with an increase in the spot diameter due to deviation in the focal position. It may be possible to increase the laser power by changing a density of an ND filter or changing a duty ratio of a lighting time of the laser light source 21.

FIG. 8C is a diagram for explaining a relationship between the spot diameter and the energy×the laser power per unit area according to the present embodiment. While the spot diameter increases and the energy per unit area decreases with an increase in the distance from the focal position, in the present embodiment, the energy per unit area is maintained constant by increasing the laser power.

FIG. 9 is a diagram for explaining setting of the focal point and power of the laser light according to the present embodiment. (1) indicates a case in which the pattern 11 is formed on only the top portion 1A and the beam expander 23 is set such that the focal position 30 of the laser light 27 is located in the vicinity of the top portion 1A as illustrated in FIG. 6A. In this case, the pattern 11 is not to be formed on the side portion 1C and the bottom portion 1B, and therefore, it is possible to maintain the laser power constant without any problem. In this case, the pattern 11 formed on the top portion 1A has good visibility because the pattern 11 can be viewed from any direction.

(2) indicates a case in which the pattern 11 is formed on only the side portion 1C and the beam expander 23 is set such that the focal point 30 of the laser light 27 is located in the vicinity of the side portion 1C as illustrated in FIG. 6B. In this case, the pattern 11 is not to be formed on the top portion 1A and the bottom portion 1B, and therefore, it is possible to maintain the laser power constant without any problem. In this case, the pattern 11 formed on the side portion 1C has good visibility from above the container, and is not deleted due to rubbing of the surface at the time of manufacturing and transportation.

(3) indicates a case in which the pattern 11 is formed on only the bottom portion 1B and the beam expander 23 is set such that the focal point 30 of the laser light 27 is located in the vicinity of the bottom portion 1B as illustrated in FIG. 6C. In this case, the pattern 11 is not to be formed on the top portion 1A and the side portion 1C, and therefore, it is possible to maintain the laser power constant without any problem. In this case, the pattern 11 formed on the bottom portion 1B is not deleted due to rubbing of the surface at the time of manufacturing and transportation.

(4) indicates a case in which the thin pattern 11 is formed on the top portion 1A and the thick pattern 11 is formed on the bottom portion 1B and the beam expander 23 is set such that the focal point 30 of the laser light 27 is located in the vicinity of the top portion 1A as illustrated in FIG. 6A. In this case, the spot diameter 31 in the vicinity of the bottom portion 1B is increased as illustrated in FIG. 7A, so that when laser is applied to the bottom portion 1B, the laser light source 21 is controlled such that the laser power is increased as compared to the case in which laser is applied to the top portion 1A.

(5) indicates a case in which the thick pattern 11 is formed on the top portion 1A and the thin pattern 11 is formed on the bottom portion 1B and the beam expander 23 is set such that the focal point 30 of the laser light 27 is located in the vicinity of the bottom portion 1B as illustrated in FIG. 6C. In this case, the spot diameter 32 in the vicinity of the top portion 1A is increased as illustrated in FIG. 7C, so that when laser is applied to the top portion 1A, the laser light source 21 is controlled such that the laser power is increased as compared to the case in which laser is applied to the bottom portion 1B.

(6) indicates a case in which the patterns 11 are formed on the top portion 1A, the side portion 1C, and the bottom portion 1B and the beam expander 23 is set such that the focal point 30 of the laser light 27 is located in the vicinity of the side portion 1C as illustrated in FIG. 6B. In this case, the spot diameter 32 in the vicinity of the top portion 1A and the spot diameter 31 in the vicinity of the bottom portion 1B are increased as illustrated in FIG. 7B, but are still smaller than those in the cases of FIG. 7A and FIG. 7C, and therefore, the laser power is maintained constant.

Figure 10A:
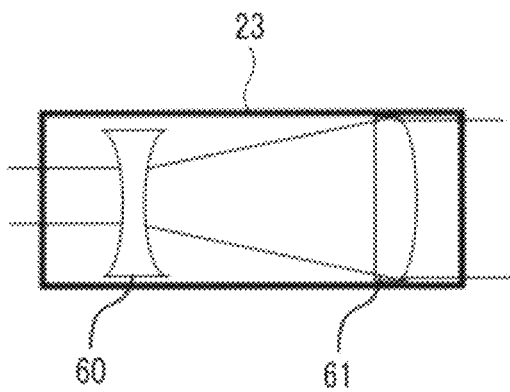
FIG. 10A is a diagram for explaining a beam expander according to the present embodiment.
Figure 10B:
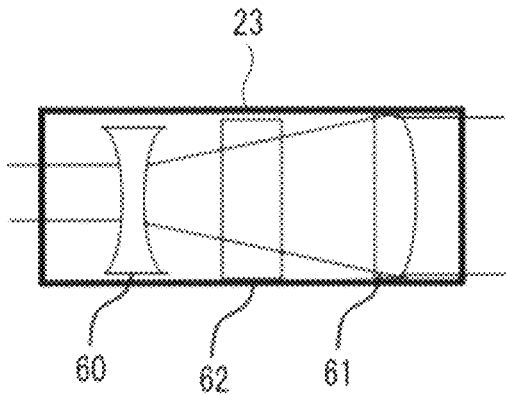
FIG. 10B is a diagram for explaining a beam expander according to the present embodiment.
Figure 10C:
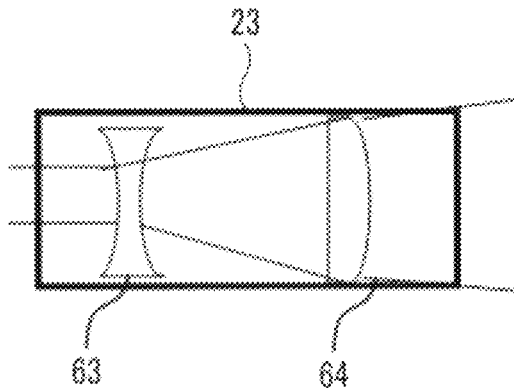
FIG. 10C is a diagram for explaining a beam expander according to the present embodiment.

FIGS. 10A to 10C are diagrams for explaining the beam expander according to the present embodiment. The beam expander 23 illustrated in FIG. 10A includes a concave lens 60 with a negative power and a convex lens 61 with a positive power. With this configuration, a beam width is increased and it is possible to further reduce a beam diameter that is narrowed by the scanning lens.

Here, if the concave lens 60 is moved to the right in an optical axis direction, light emitted from the convex lens 61 becomes diverging light, and the focal point 30 is moved from the top portion 1A toward the bottom portion 1B in the vicinity of the container 1. Meanwhile, the same effect is achieved by moving the convex lens 61 in the optical axis direction.

In the present embodiment, it is possible to detect the position of the protrusion shape portion or the recess shape portion of the base material 1*a* or a distance to the protrusion shape portion or the recess shape portion of the base material 1*a* on the basis of output from the stereo cameras 26*a* and 26*b*, and cause the concave lens 60 or the convex lens 61 to move in the optical axis direction on the basis of a detection result.

The beam expander 23 illustrated in FIG. 10B further includes a parallel plate 62 in an insertable and removable manner between the concave lens 60 and the convex lens 61 in addition to the configuration as illustrated in FIG. 10A.

If the parallel plate 62 is inserted, light emitted from the positive lens 61 becomes converging light, so that the focal point 30 is moved from the bottom portion 1B toward the top portion 1A in the vicinity of the container 1. By arranging the plurality of parallel plates 62, it is possible to cope with various focal points 30. Furthermore, it is sufficient to insert the parallel plate 62 in a portion corresponding to the converging light or the diverging light, and the same effect can be achieved even if the parallel plate 62 is not arranged inside the beam expander 23.

In the present embodiment, it is possible to detect the position of the protrusion shape portion or the recess shape portion of the base material 1*a* or the distance to the protrusion shape portion or the recess shape portion of the base material 1*a* on the basis of the output from the stereo cameras 26*a* and 26*b*, and control insertion or removal of the parallel plate 62 on the basis of a detection result.

The beam expander 23 illustrated in FIG. 10C includes a concave lens 63 and a convex lens 64, and performs adjustment such that a light beam emitted from the convex lens 64 becomes diverging light. If the beam expander 23 illustrated in FIG. 10A is replaced with the beam expander 23 illustrated in FIG. 10C, the focal point 30 is moved from the top portion 1A toward the bottom portion 1B in the vicinity of the container 1. It may be possible to arrange the beam expander 23 that copes with various focal positions.

In the present embodiment, it is possible to detect the position of the protrusion shape portion or the recess shape portion of the base material 1*a* or the distance to the protrusion shape portion or the recess shape portion of the base material 1*a* on the basis of the output from the stereo cameras 26*a* and 26*b*, and control replacement of the beam expander 23 on the basis of a detection result.

Figure 11:
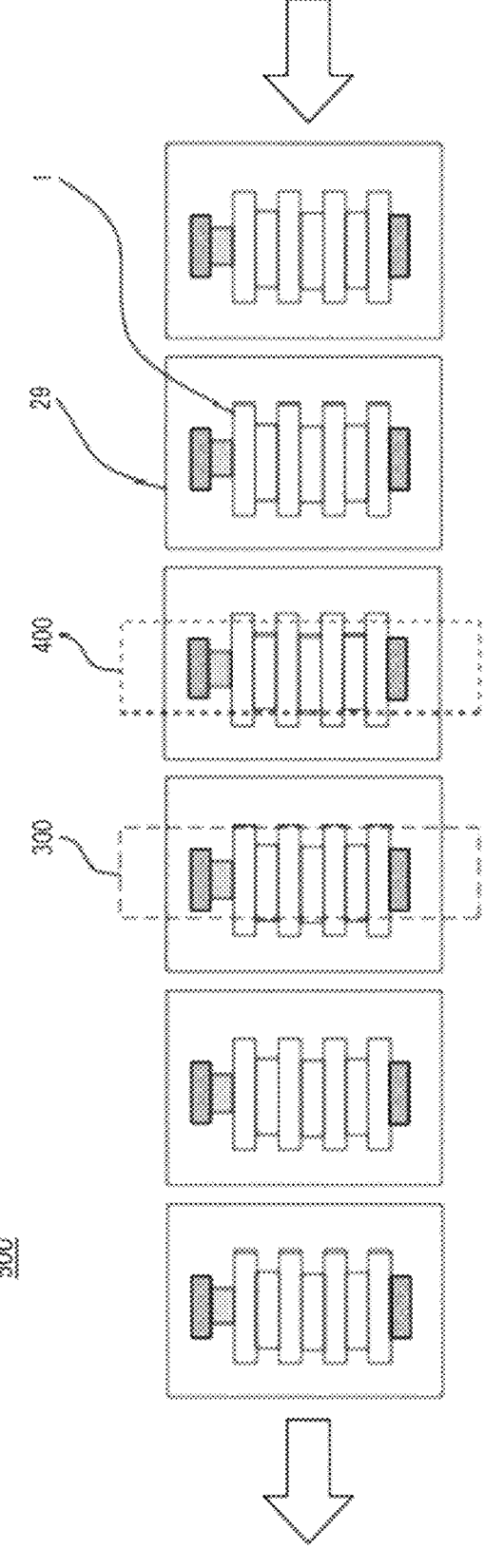
FIG. 11 is a diagram for explaining a modification of the manufacturing apparatus according to the present embodiment.

FIG. 11 is a diagram for explaining a modification of the manufacturing apparatus according to the present embodiment. The manufacturing apparatus 500 illustrated in FIG.

11 is a line that moves from right to left, and includes, on the line, a first mounting unit 300 on which the laser irradiation unit is mounted, and a second mounting unit 400 on which the stereo cameras 26a and 26b are mounted. In this manner, by separately mounting the stereo cameras 26a and 26b and the laser irradiation unit 20, it is possible to produce, at a high speed, a large amount of the base materials 1a on which the patterns 11 are formed.

In this case, by setting, in advance, a reference position to be detected by the stereo cameras 26a and 26b to the center of the base material 1a, the holding plate 29, or the like, and adjusting a laser irradiation reference, it is possible to determine a laser irradiation position with high accuracy.

Figure 12A:
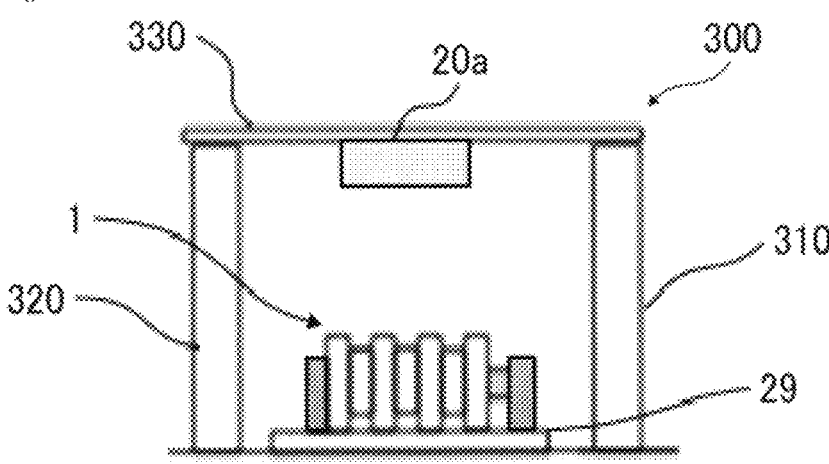
FIG. 12A is a diagram for explaining a first mounting unit and a second mounting unit according to the modification illustrated in FIG. 11.
Figure 12B:
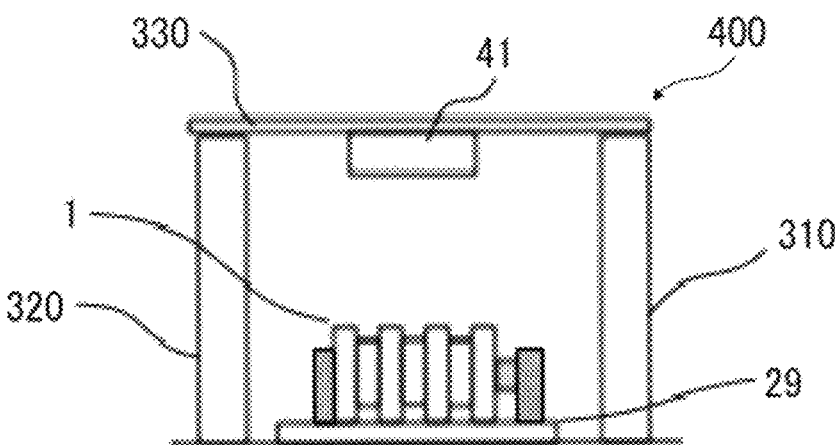
FIG. 12B is a diagram for explaining the first mounting unit and the second mounting unit according to the modification illustrated in FIG. 11.

FIGS. 12A and 12B are diagrams for explaining the first mounting unit and the second mounting unit according to the modification illustrated in FIG. 11. The first mounting unit 300 illustrated in FIG. 12A includes a holding portion 330 on columns 310 and 320, and a laser irradiation unit 20a is mounted. The laser irradiation unit 20 illustrated in FIG. 5 includes the stereo cameras 26a and 26b, but the laser irradiation unit 20a illustrated in FIG. 12A is configured by removing the stereo cameras 26a and 26b from the laser irradiation unit 20.

The second mounting unit 400 illustrated in FIG. 12B includes the holding portion 330 on the columns 310 and 320, and a stereo camera 41 is mounted. The stereo camera 41 is configured in the same manner as the stereo cameras 26a and 26b illustrated in FIG. 5.

Figure 13A:
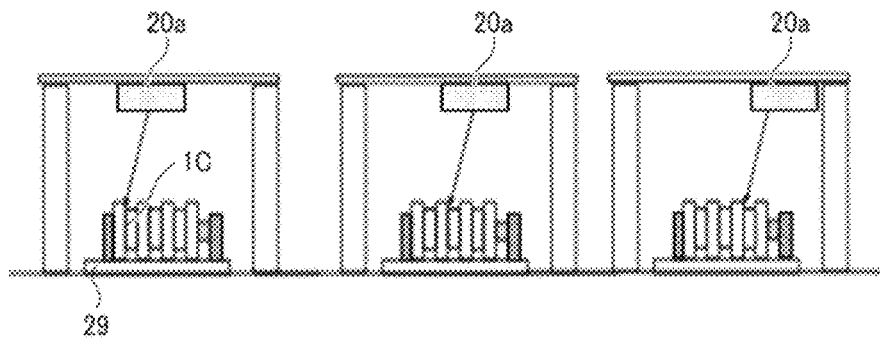
FIG. 13A is a diagram for explaining a laser irradiation direction according to the modification illustrated in FIG. 11.
Figure 13B:
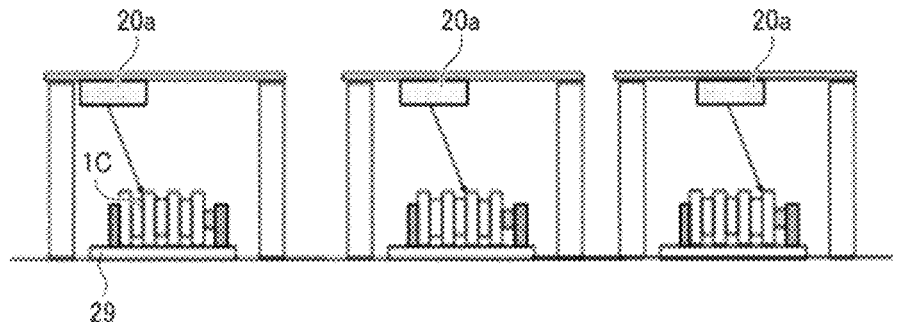
FIG. 13B is a diagram for explaining a laser irradiation direction according to the modification illustrated in FIG. 11.
Figure 13C:
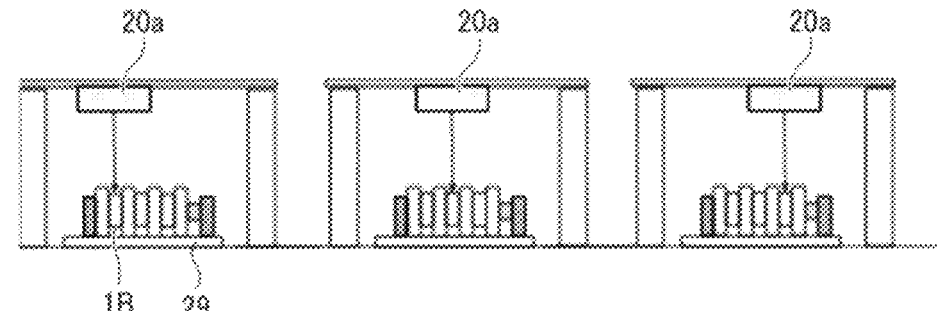
FIG. 13C is a diagram for explaining a laser irradiation direction according to the modification illustrated in FIG. 11.

FIGS. 13A to 13C are diagrams for explaining a laser irradiation direction according to the modification illustrated in FIG. 11. If the side portion 1C is shadowed by a protrusion shape portion with respect to the laser irradiation unit 20a, the side portion 1C is not irradiated with laser and the pattern 11 is not formed. To cope with this, as illustrated in FIGS. 13A and 13B, by moving the laser irradiation unit 20a in a direction (in the horizontal direction in the figure) perpendicular to the flow of the line with respect to the holding plate 29, it is possible to irradiate all of the side portions 1C with laser and form the patterns 11.

Similarly, as illustrated in FIG. 13C, it is possible to form the pattern 11 by irradiating all of the bottom portions 1B with laser by moving the laser irradiation unit 20a in the direction (in the horizontal direction in the figure) perpendicular to the flow of the line with respect to the holding plate 29.

Meanwhile, it may be possible to move the holding plate 29 in the direction perpendicular to the flow of the line with respect to the laser irradiation unit 20a instead of operation illustrated in FIGS. 13A to 13C.

While it is explained that the container 1 is fixed to a holding unit 28 in the description above, it may be possible to rotate the container 1 relative to the holding unit 28 while determining a reference of the rotation direction, cause a stereo camera 26 to detect the protrusion shape portion and the recess shape portion corresponding to one circumference of the container 1 in the rotation direction, and set the focal point 30 of the laser light between the detected protrusion shape portion and the detected recess shape portion. In this case, laser irradiation is performed in a rotating manner, so that it is possible to apply laser to the entire circumference of the container 1 and form the pattern 11.

FIGS. 14A to 14D are diagrams illustrating a modification of the container according to the present embodiment. The container 1 illustrated in FIG. 14A includes the plurality of bottom portions 1B, and all of the bottom portions 1B serve as the pattern regions in which the patterns 11 are formed. In contrast, the container 1 includes the plurality of top portions 1A and the plurality of side portions 1C, and all of the top portions 1A and all of the side portions 1C serve as the non-pattern regions 12 in which the patterns 11 are not formed. In this case, it is preferable to apply laser with the setting as illustrated in FIG. 9(3).

Figure 14A:
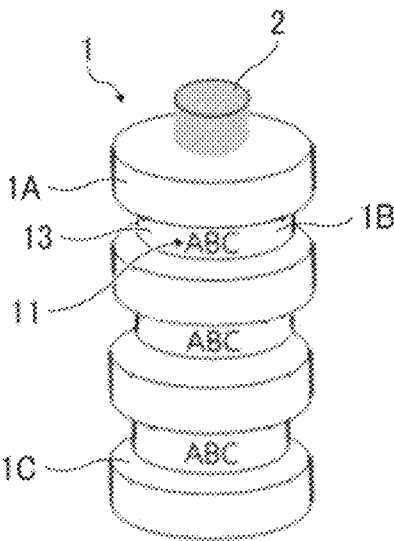
FIG. 14A is a diagram illustrating a modification of the container according to the present embodiment.
Figure 14B:
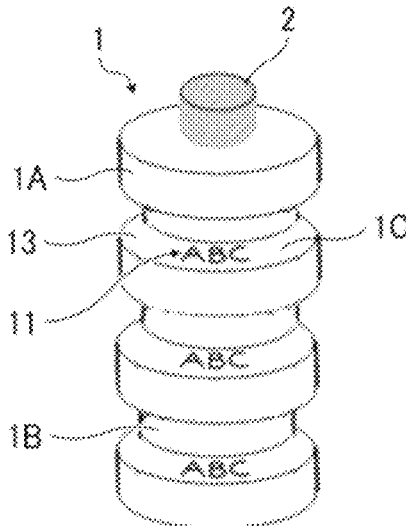
FIG. 14B is a diagram illustrating a modification of the container according to the present embodiment.

The container 1 illustrated in FIG. 14B includes the plurality of side portions 1C, and all of the side portions 1C serve as the pattern region 13 in which the patterns 11 are formed. In contrast, the container 1 includes the plurality of top portions 1A and the plurality of bottom portions 1B, and all of the top portions 1A and all of the bottom portions 1B serve as the non-pattern region 12 in which the patterns 11 are not formed. In this case, it is preferable to apply laser with the setting as illustrated in FIG. 9(2).

Figure 14C:
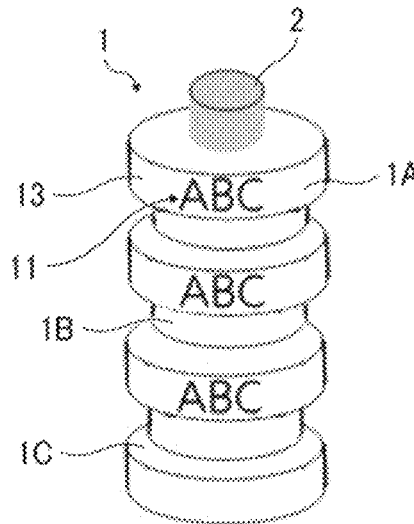
FIG. 14C is a diagram illustrating a modification of the container according to the present embodiment.

The container 1 illustrated in FIG. 14C includes the plurality of top portions 1A, and all of the top portions 1A serve as the pattern region 13 in which the patterns 11 are formed. In contrast, the container 1 includes the plurality of top portions 1A and the plurality of bottom portions 1B, and all of the top portions 1A and all of the bottom portions 1B serve as the non-pattern regions 12 in which the patterns 11 are not formed. In this case, it is preferable to apply laser with the setting as illustrated in FIG. 9(1).

Figure 14D:
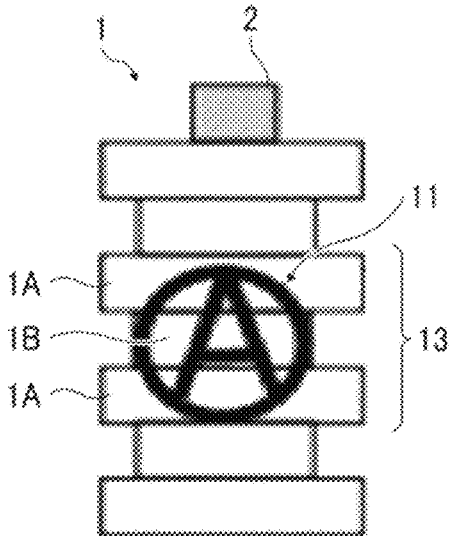
FIG. 14D is a diagram illustrating a modification of the container according to the present embodiment.

The container 1 illustrated in FIG. 14D includes the plurality of top portions 1A, the plurality of bottom portions 1B, and the plurality of side portions 1C, and the two adjacent top portions 1A and the bottom portion 1B between the two adjacent top portions 1A serve as the pattern regions 13 in which the pattern 11 is formed. The other top portions 1A, the other bottom portions 1B, and all of the side portions 1C serve as the non-pattern regions 12 in which the patterns 11 are not formed. In FIG. 14D, the pattern 11 is formed across the two top portions 1A and the single bottom portion 1B, but the pattern 11 may be formed across two or more of the top portions 1A, the bottom portions 1B, and the side portions 1C. In this case, it is preferable to apply laser with the setting as illustrated in FIG. 9(6).

FIGS. 15A to 15D are diagrams illustrating a second modification of the container according to the present embodiment. The container 1 illustrated in FIG. 15A includes the plurality of top portions 1A having protrusion shapes, and one of the top portions 1A includes a recess shape portion 51 that is formed by embossing.

Figure 15A:
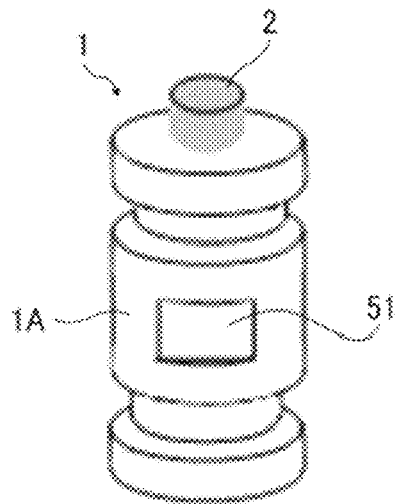
FIG. 15A is a diagram illustrating a second modification of the container according to the present embodiment.
Figure 15B:
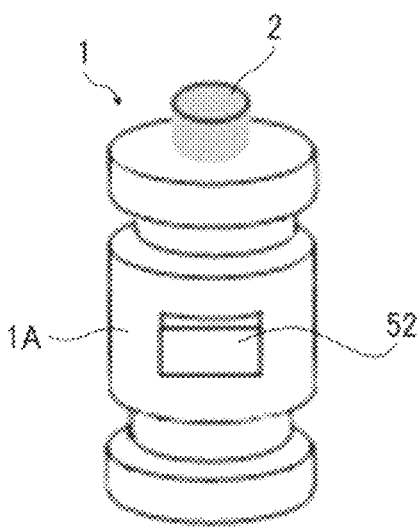
FIG. 15B is a diagram illustrating the second modification of the container according to the present embodiment.

The container 1 illustrated in FIG. 15B includes the plurality of top portions 1A having the protrusion shapes, and one of the top portions 1A includes a protrusion shape portion 52 that is formed by embossing.

Figure 15C:
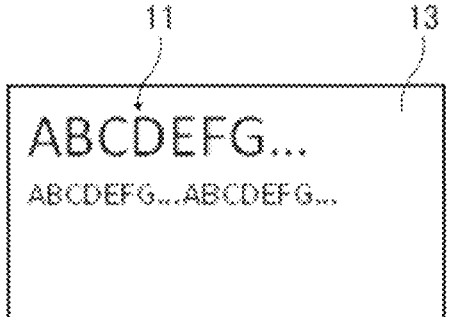
FIG. 15C is a diagram illustrating the second modification of the container according to the present embodiment.
Figure 15D:
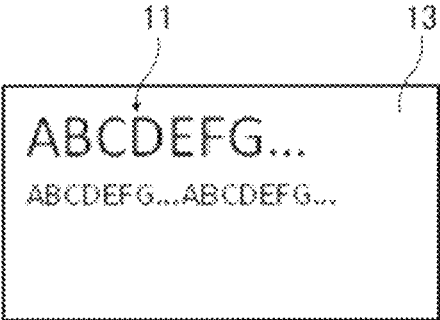
FIG. 15D is a diagram illustrating the second modification of the container according to the present embodiment.

Each of the recess shape portion 51 illustrated in FIG. 15A and the protrusion shape portion 52 illustrated in FIG. 15B includes, as illustrated in FIG. 15C and FIG. 15D, the pattern region 13 in which the pattern 11 including characters and lines enclosing the characters is formed. The recess shape portion 51 and the protrusion shape portion 52 have rectangular shapes, but the shapes are not specifically limited and different shapes, such as circular shapes or polygonal shapes, may be appropriately adopted.

As for the pattern 11 illustrated in FIG. 15D, a right line and a bottom line among lines around the periphery of the characters are made thicker than lines around the pattern 11 illustrated in FIG. 15C. Accordingly, the characters included in the pattern 11 are viewed stereoscopically.

Figure 16A:
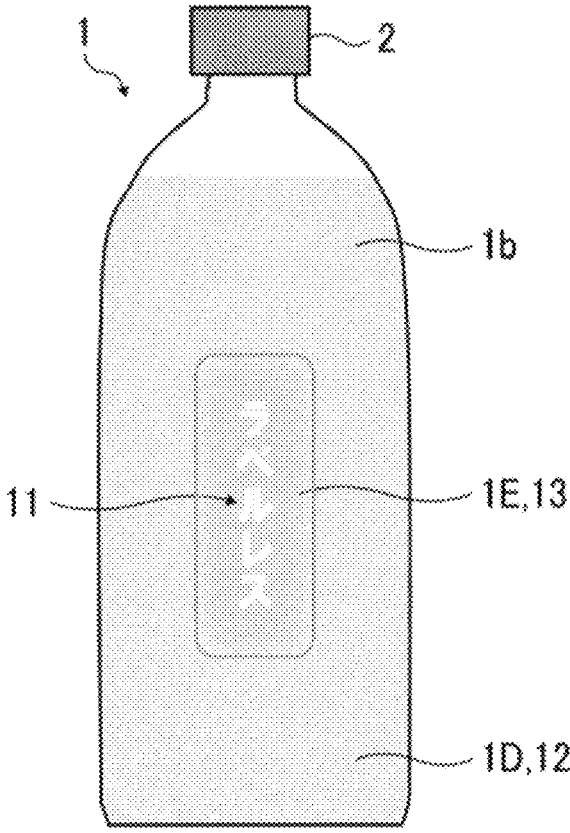
FIG. 16A is a diagram illustrating a third modification of the container according to the present embodiment.
Figure 16B:
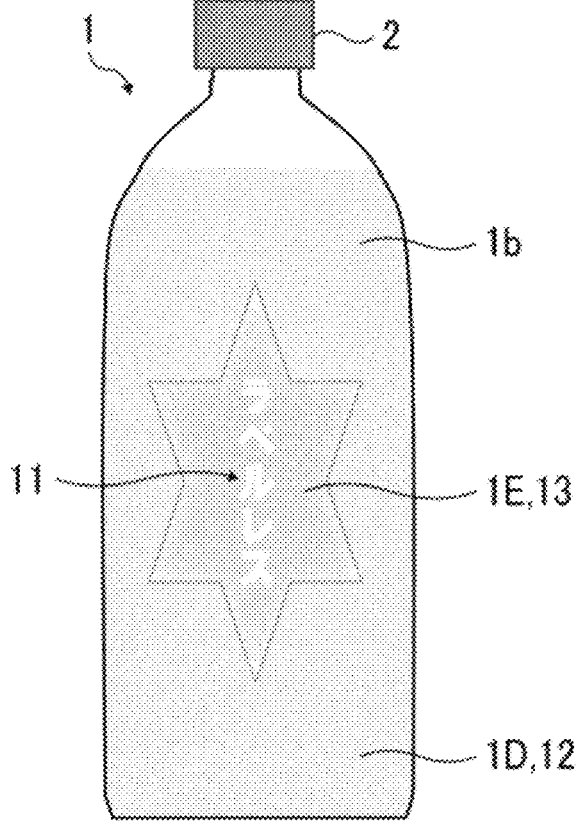
FIG. 16B is a diagram illustrating the third modification of the container according to the present embodiment.

FIGS. 16A and 16B are diagrams illustrating a third modification of the container according to the present embodiment. The container 1 illustrated in each of FIGS. 16A and 16B includes a reference surface 1D and an embossed portion 1E that is formed by embossing, and contains a contents 1b. As described above, the container 1 and the contents 1b constitute the containing body. The embossed portion 1E is configured with a protrusion shape portion that protrudes from the reference surface 1D or a recess shape portion that is recessed from the reference surface 1D. While a protrusion shape portion or a recess shape portion having a rectangular shape with rounded corners is illustrated in FIG. 16A and the protrusion shape portion or the recess shape portion having a star shape is illustrated in FIG. 16B, the shape is not specifically limited and a different shape, such as a circular shape or a polygonal shape, may be appropriately adopted.

The embossed portion 1E is formed in a graphical shape and includes the pattern region 13, in which the pattern 11 is formed, on the inner side of the embossed portion 1E. In contrast, the reference surface 1D is the non-pattern region 12 in which the pattern 11 is not formed.

Figures 17, 18, 19A:
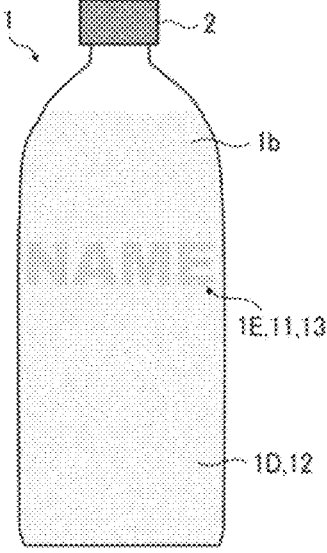
FIG. 17 is a diagram illustrating a fourth modification of the container according to the present embodiment.
FIG. 18 is a diagram illustrating a fifth modification of the container according to the present embodiment.
FIG. 19A is a diagram illustrating a sixth modification of the container according to the present embodiment.

FIG. 17 is a diagram illustrating a fourth modification of the container according to the present embodiment. The container 1 illustrated in FIG. 17 includes the reference surface 1D and the embossed portion 1E and contains the contents 1b. The embossed portion 1E in FIG. 17 is a protrusion shape portion or a recess shape portion. The embossed portion 1E is formed in a character shape, and serves as the pattern region 13 in which the pattern 11 is formed inside the embossed portion 1E so as to conform to the shape of the embossed portion 1E. The pattern 11 is formed in a similar shape to the character shape in which the embossed portion 1E is formed. In contrast, the reference surface 1D serves as the non-pattern region 12 in which the pattern 11 is not formed. In other words, the pattern is formed in a portion along the protrusion shape portion or the recess shape portion. In FIG. 17, the pattern 11 is formed inside the embossed portion 1E, so that the characters can more easily be viewed as compared to a case in which only the embossed portion or the pattern is used.

FIG. 18 is a diagram illustrating a fifth modification of the container according to the present embodiment. The container 1 illustrated in FIG. 18 includes the reference surface 1D and the embossed portion 1E and contains the contents 1b. The embossed portion 1E in FIG. 18 is a protrusion shape portion. The embossed portion 1E is formed in a character shape and serves as the pattern region 13 in which the pattern 11 is formed outside the embossed portion 1E. In FIG. 18, the pattern region is formed outside the embossed portion 1E, which is different from the case in FIG. 17, so that a shadow is generated on the outer side and the pattern is expressed stereoscopically. The pattern 11 is formed in a similar shape to the character shape in which the embossed portion 1E is formed, and is formed so as to represent shadows around the character shape in which the embossed portion 1E is formed. In contrast, the reference surface 1D is the non-pattern region 12 in which the pattern 11 is not formed. The pattern 11 is formed around the protrusion shape portion.

FIGS. 19A to 19D are diagrams illustrating a sixth modification of the container according to the present embodiment. The container 1 illustrated in FIG. 19A to 19D includes the reference surface 1D and the embossed portion 1E and contains the contents 1b. The embossed portion 1E in FIG. 19 is a protrusion shape portion or a recess shape portion. The embossed portion 1E is formed in a character shape, and serves as the pattern region 13 in which the pattern 11 is formed inside the embossed portion 1E so as to conform to the shape 1E of the embossed portion. In contrast, the reference surface 1D is the non-pattern region 12 in which the pattern 11 is not formed. In other words, the pattern is formed in a portion along the protrusion shape portion or the recess shape portion.

Figure 19B:
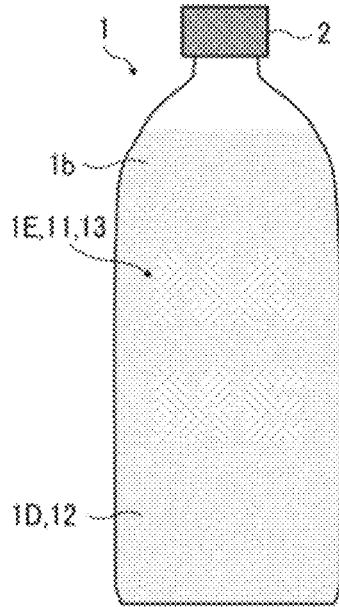
FIG. 19B is a diagram illustrating the sixth modification of the container according to the present embodiment.
Figure 19C:
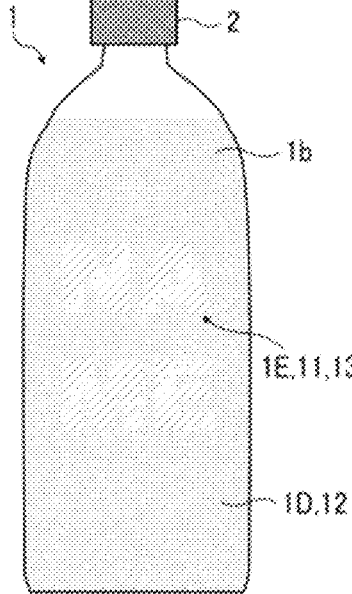
FIG. 19C is a diagram illustrating the sixth modification of the container according to the present embodiment.
Figure 19D:
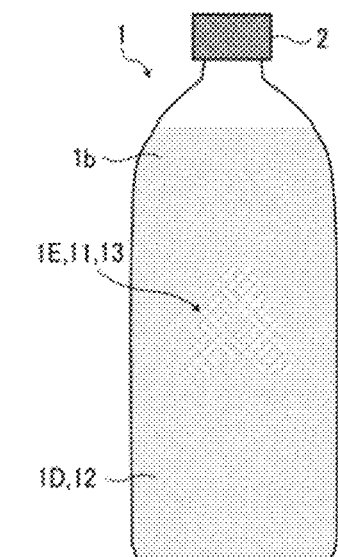
FIG. 19D is a diagram illustrating the sixth modification of the container according to the present embodiment.

The pattern 11 is formed so as to fill the character shape in which the embossed portion 1E is formed. FIG. 19A illustrates the pattern 11 with a solid color, FIG. 19B illustrates the pattern 11 with a check pattern, FIG. 19C illustrates the pattern 11 with oblique lines, and FIG. 19D illustrates the pattern 11 with a dot pattern.

Figure 20:
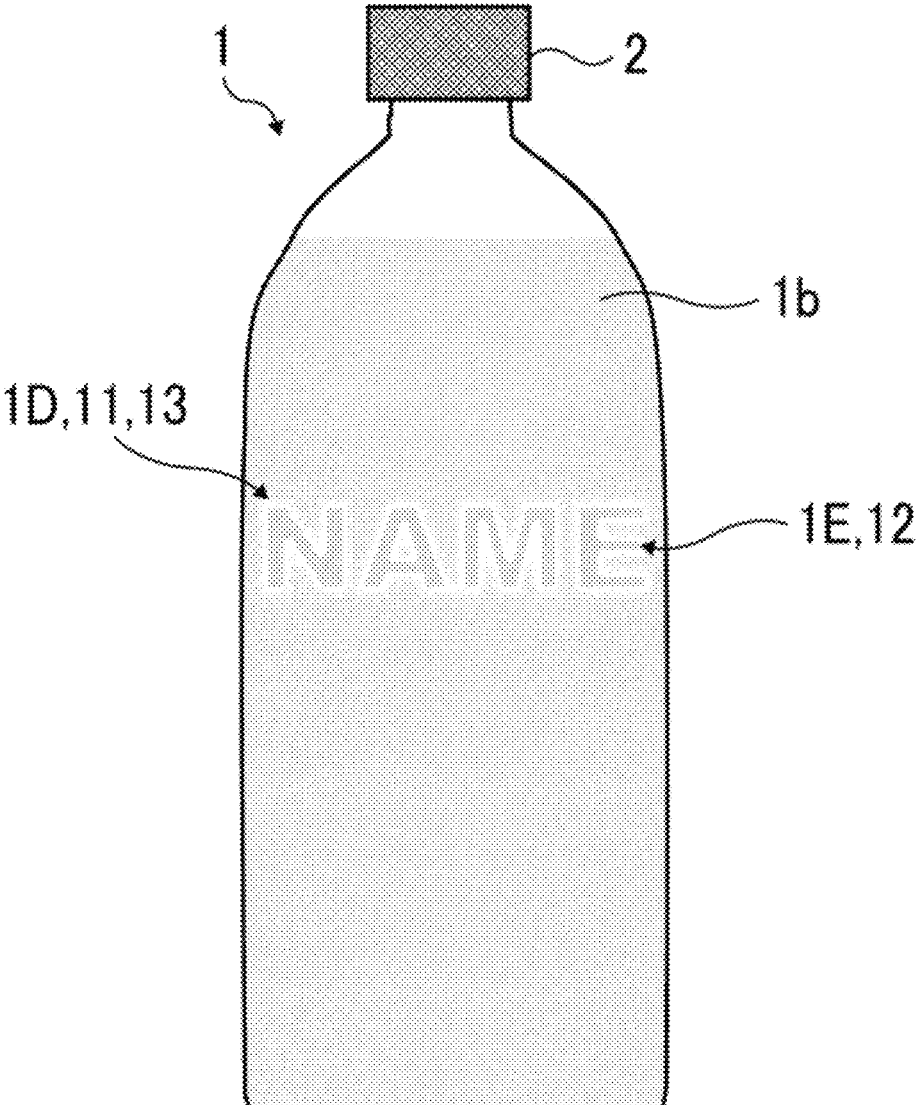
FIG. 20 is a diagram illustrating a seventh modification of the container according to the present embodiment.

FIG. 20 is a diagram illustrating a seventh modification of the container according to the present embodiment. The container 1 illustrated in FIG. 20 includes the reference surface 1D and the embossed portion 1E and contains the contents 1b. The embossed portion 1E in FIG. 20 is a recess shape portion. The embossed portion 1E is formed in a character shape, and serves the non-pattern region 12 in which the pattern 11 is not formed. In contrast, the reference surface 1D serves as the pattern region 13 in which the pattern 11 is formed around the embossed portion 1E. The pattern 11 is formed in a similar shape to the character shape in which the embossed portion 1E is formed, and is formed so as to fringe the outer circumference of the character shape in which the embossed portion 1E is formed. The pattern 11 is formed around the recess shape portion.

Figure 21:
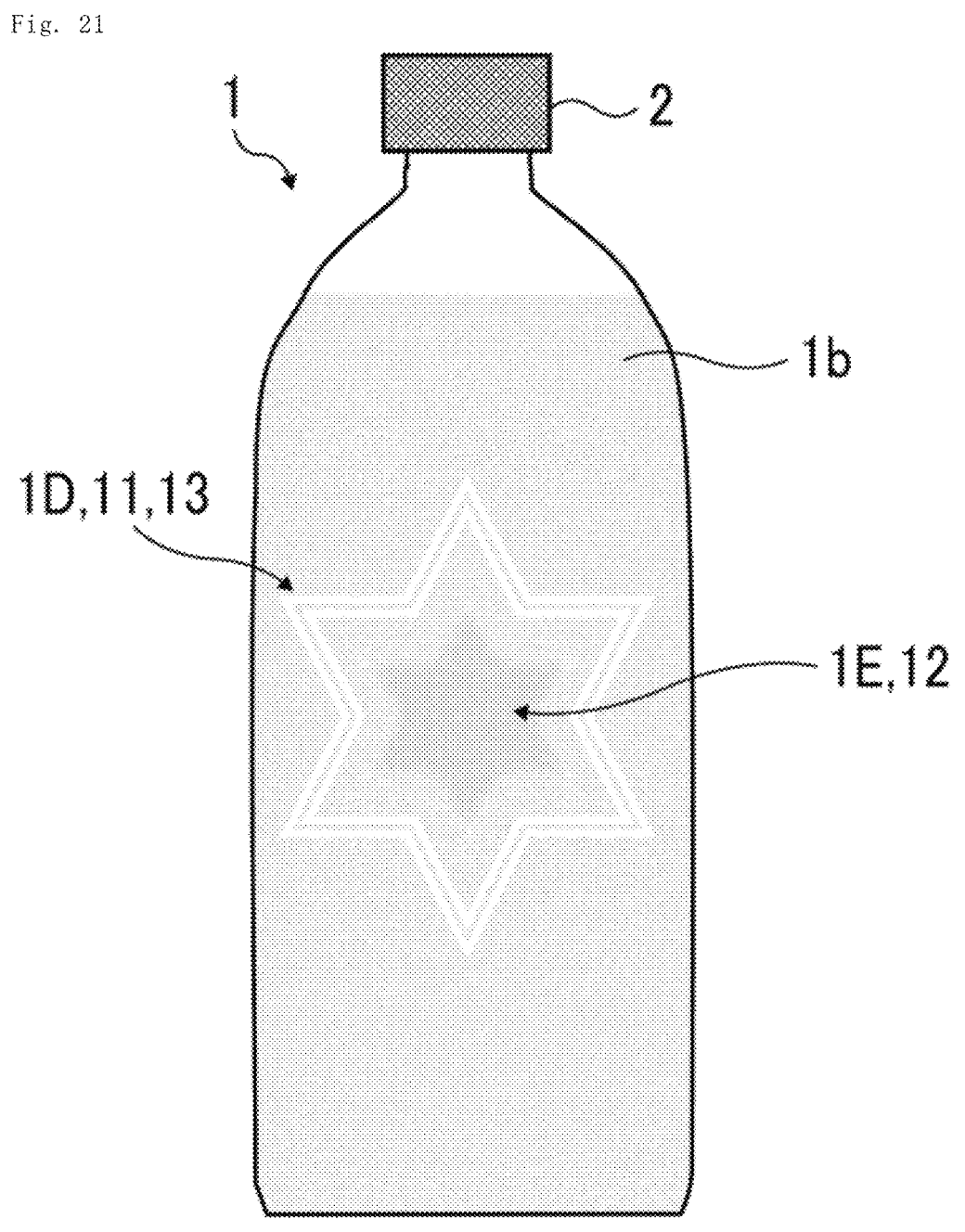

FIG. 21 is a diagram illustrating an eighth modification of the container according to the present embodiment. The container 1 illustrated in FIG. 21 includes the reference surface 1D and the embossed portion 1E and contains the contents 1b. The embossed portion 1E in FIG. 21 is a protrusion shape portion or a recess shape portion. The embossed portion 1E is formed in a graphical shape, and serves as the non-pattern region 12 in which the pattern 11 is not formed. In contrast, the reference surface 1D serves as the pattern region 13 in which the pattern 11 is formed around the embossed portion 1E. The pattern 11 is formed in a similar shape to the graphical shape in which the embossed portion 1E is formed, and is formed around the outer periphery of the graphical shape in which the embossed portion 1E is formed. In other words, the pattern is formed in a portion along the protrusion shape portion or the recess shape portion. In FIG. 21, the protrusion shape portion or the recess shape portion in the star shape is illustrated, but the shape is not specifically limited and a different shape, such as a circular shape or a polygonal shape, may be appropriately adopted.

Figure 22:
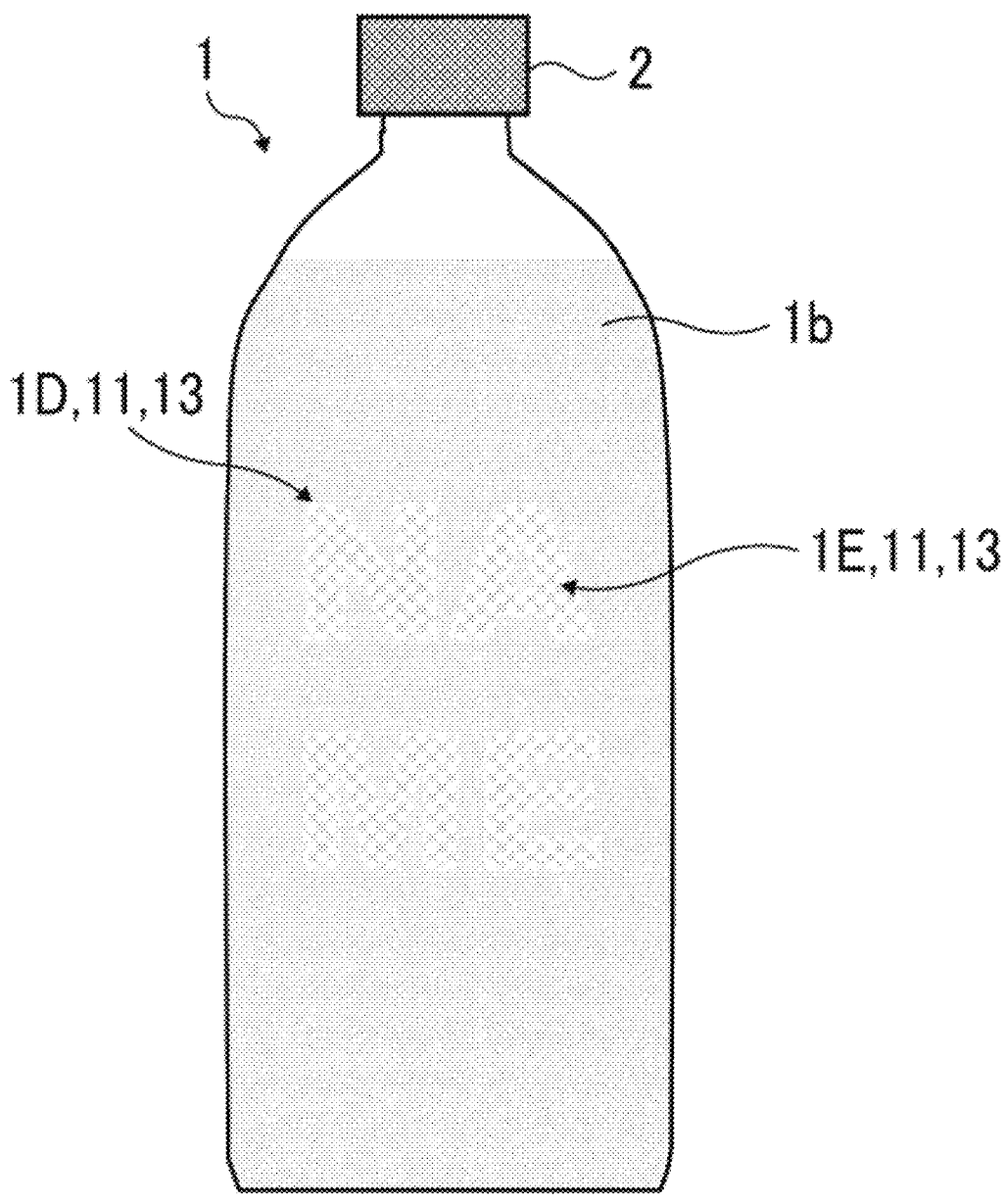
FIG. 22 is a diagram illustrating a ninth modification of the container according to the present embodiment.

FIG. 22 is a diagram illustrating a ninth modification of the container according to the present embodiment. The container 1 illustrated in FIG. 22 includes the reference surface 1D and the embossed portion 1E and contains the contents 1b. The embossed portion 1E in FIG. 22 is a protrusion shape portion or a recess shape portion. The embossed portion 1E is formed in a character shape, and serves as the pattern region 13 in which the pattern 11 is formed inside the embossed portion 1E. The reference surface 1D also serves as the pattern region 13 in which the pattern 11 is formed around the embossed portion 1E.

The pattern 11 in the embossed portion 1E is formed in a check pattern so as to fill the character shape in which the embossed portion 1E is formed. The pattern 11 on the reference surface 1D is formed in a similar shape to the character shape in which the embossed portion 1E is formed, and is formed so as to fringe the outer circumference of the character shape in which the embossed portion 1E is formed. In other words, the pattern is formed in a portion along the protrusion shape portion or the recess shape portion.

Figure 23:
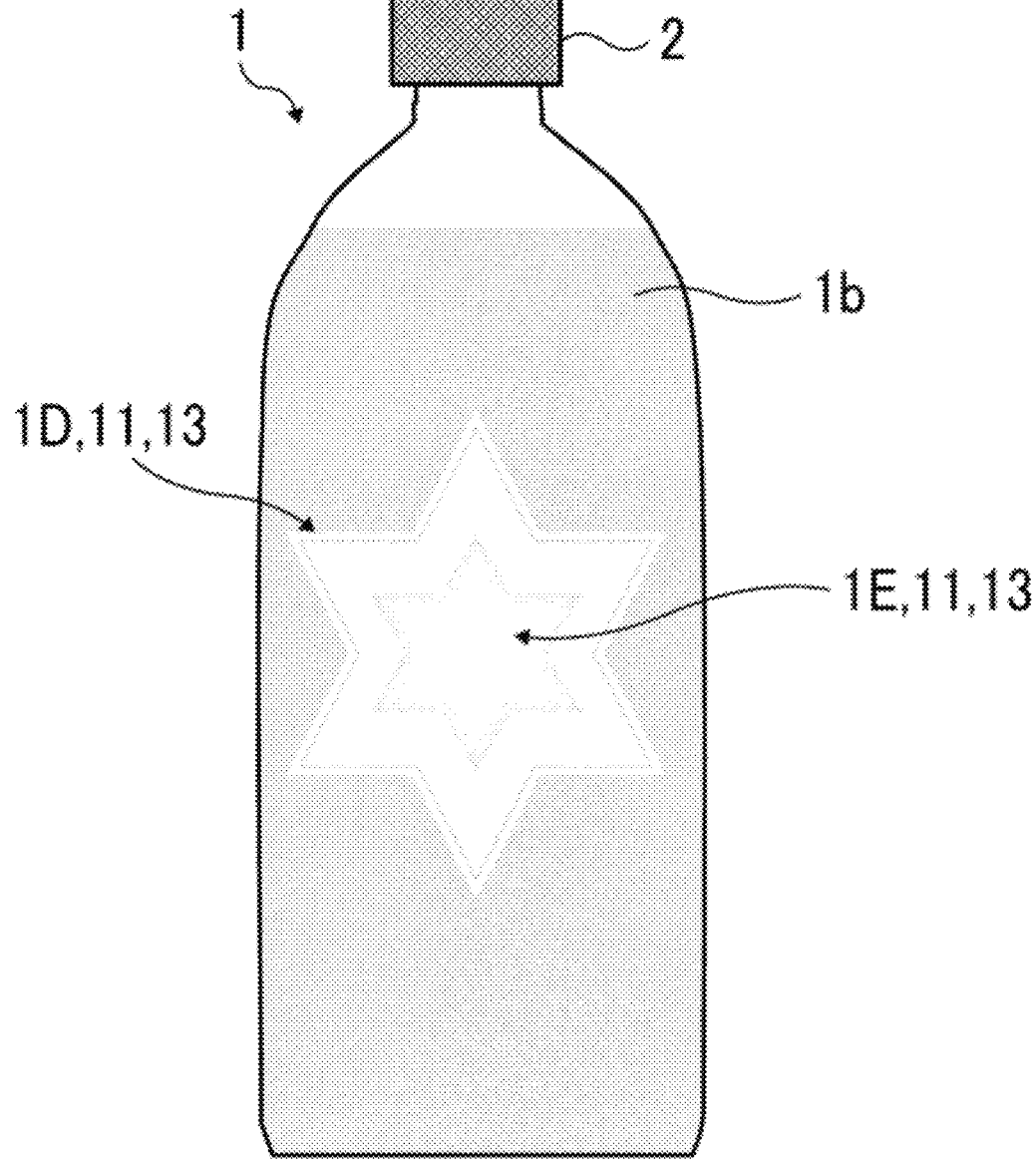
FIG. 23 is a diagram illustrating a tenth modification of the container according to the present embodiment.

FIG. 23 is a diagram illustrating a tenth modification of the container according to the present embodiment. The container 1 illustrated in FIG. 23 includes the reference surface 1D and the embossed portion 1E and contains the contents 1*b*. The embossed portion 1E in FIG. 23 is a protrusion shape portion or a recess shape portion. The embossed portion 1E is formed in a graphical shape, and serves as the pattern region 13 in which the pattern 11 is formed inside the embossed portion 1E. The reference surface 1D also serves as the pattern region 13 in which the pattern 11 is formed around the embossed portion 1E.

The pattern 11 in the embossed portion 1E is formed with a solid color so as to fill the graphical shape in which the embossed portion 1E is formed. The pattern 11 on the reference surface 1D has a similar shape to the graphical shape in which the embossed portion 1E is formed, and is formed with a solid color around an outer circumference of the graphical shape in which the embossed portion 1E is formed. In other words, the pattern is formed in a portion along the protrusion shape portion or the recess shape portion.

Figure 24:
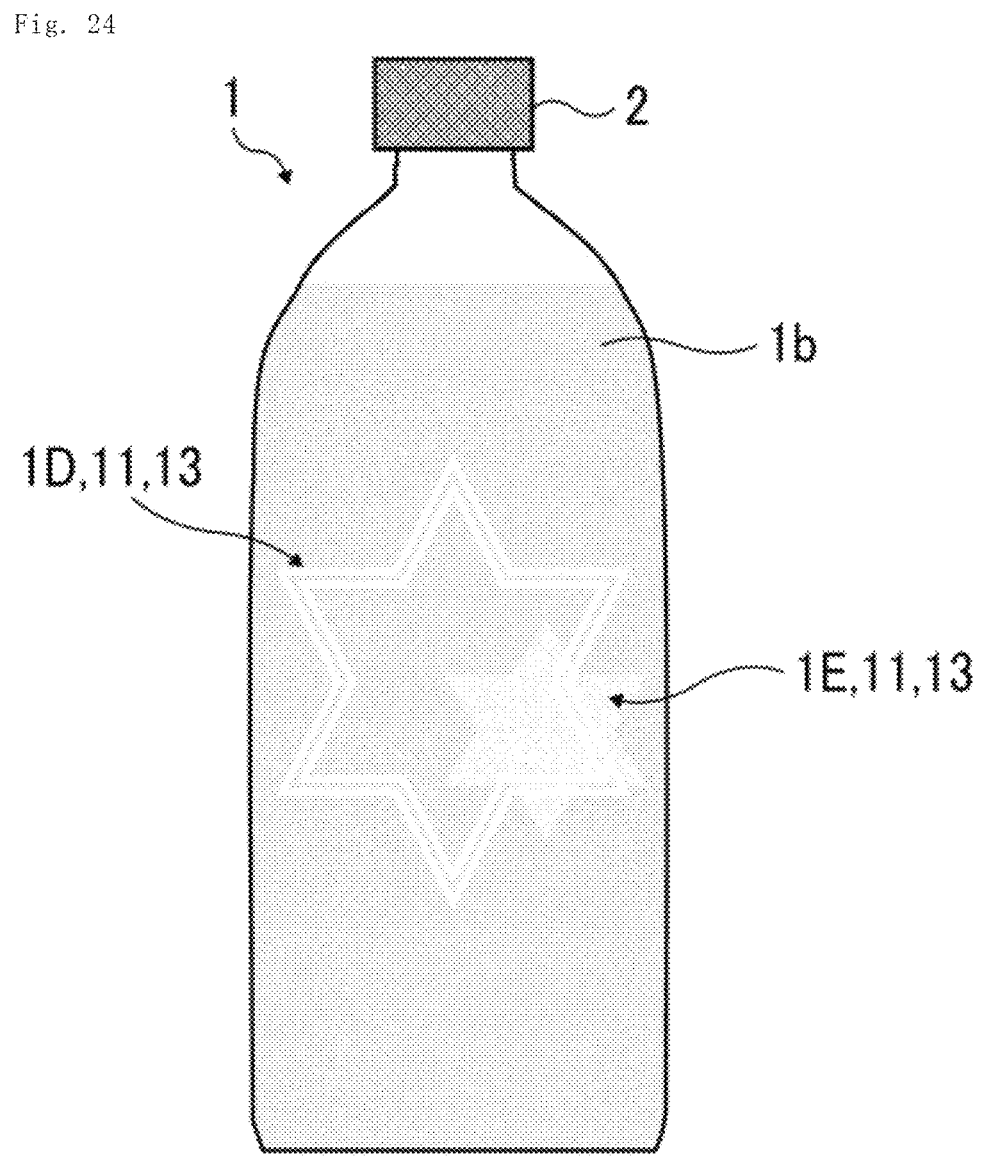

FIG. 24 is a diagram illustrating an eleventh modification of the container according to the present embodiment. The container 1 illustrated in FIG. 24 includes the reference surface 1D and the embossed portion 1E and contains the contents 1*b*. The embossed portion 1E in FIG. 24 is a protrusion shape portion or a recess shape portion. The embossed portion 1E is formed in a graphical shape, and serves as the pattern region 13 in which the pattern 11 is formed inside the embossed portion 1E. The reference surface 1D also serves as the pattern region 13 in which the pattern 11 that overlaps with the embossed portion 1E is formed.

The pattern 11 in the embossed portion 1E is formed with a solid color so as to fill the graphical shape in which the embossed portion 1E is formed. The pattern 11 on the reference surface 1D has a similar shape to the graphical shape in which the embossed portion 1E is formed, and is formed so as to overlap with the graphical shape in which the embossed portion 1E is formed. The pattern 11 is formed across at least the periphery of the protrusion shape portion or the periphery of the recess shape portion.

Furthermore, while an example in which the container has a cylindrical shape has been described in the embodiment, the container is not limited thereto, and a container having a box shape, a container having a pyramid shape, or the like may be adopted.

Moreover, with respect to the contents that is contained in the container 1, it is possible to provide a container on which a pattern that has a good visibility and that represents a large amount of information is formed, by increasing the contrast of the pattern with respect to a color of the contents that is contained in the container having transparency to visible light. For example, if the contents is black, it is possible to increase visibility of a pattern by forming a slightly opaque pattern on the container, and if the contents is white, it is possible to increase visibility of a pattern by forming a black-colored pattern on the container.

Furthermore, the container may have any shape, such as a cylindrical shape without a shoulder portion and an inclined portion or a quadrangular prism shape. In addition, the contents in the container may have an arbitrary color, and may be any substance, such as cold substance, hot substance, carbonated substance, or colloidal substance (e.g., yogurt or the like), as long as the substance can be contained in the container. The contents is, for example, coffee, tea, beer, drinking water, juice, carbonated drink, milk, or the like, but not is specifically limited, and any substance that can be contained in the container is applicable.

Moreover, it is possible to change a machining state depending on the contents in the container. For example, it may be possible to change the machining state for realizing a whitish state or a slightly opaque state by adjusting intensity or the like of laser in accordance with the contents in the container, and control contrasting density.

Furthermore, it may be possible to form the dot portions in accordance with the shape of the embossed portion of a PET bottle. Moreover, it may be possible to perform machining on the contour, the inner portion, or the outer circumference of the recess-protrusion shape portion by additionally performing inclination machining as described above.

CONCLUSION

As described above, the manufacturing apparatus 500 as one example of a pattern forming apparatus on the base material 1*a* according to one embodiment of the present disclosure includes the holding unit 28 that holds the base material 1*a* on which a protrusion shape portion or a recess shape portion is formed, and the laser irradiation unit 20 as one example of a pattern forming unit that forms the pattern 11 on the base material 1*a*, where the pattern 11 is formed on at least one of the protrusion shape portion, the recess shape portion, a periphery of the protrusion shape portion, a periphery of the recess shape portion, a portion along the protrusion shape portion, and a portion along the recess shape portion.

With this configuration, it is possible to allow a set of the protrusion shape portion or the recess shape portion and the pattern 11 to be viewed, so that it is possible to improve the visibility of the pattern 11 as compared to a case in which the pattern is formed on an even plane, or it is possible to emphasize the protrusion shape portion or the recess shape portion and improve design quality as compared to a case in which a pattern is not formed. If the pattern 11 is formed on the periphery of the protrusion shape portion or the periphery of the recess shape portion, the pattern 11 is arranged adjacent to the periphery of the protrusion shape portion or the recess shape portion or arranged in the vicinity of the periphery of the protrusion shape portion or the periphery of the recess shape portion with a predetermined-width interval, and is formed around the protrusion shape portion or the recess shape portion. With this configuration, the protrusion shape portion or the recess shape portion is emphasized. If the pattern 11 is arranged in the vicinity of the periphery of the protrusion shape portion or the periphery of the recess shape portion with a predetermined-width interval, it is preferable to set the predetermined width to be sufficiently smaller than the protrusion shape portion or the recess shape portion.

The laser irradiation unit 20 forms the pattern 11 on the top portion 1A of the protrusion shape portion, the side portion 1C of the protrusion shape portion, the bottom portion 1B of the recess shape portion, the side portion 1C of the recess shape portion, the periphery of the protrusion shape portion, or the periphery of the recess shape portion. The laser irradiation unit 20 may form the pattern 11 across two or more of the top portion 1A of the protrusion shape portion, the side portion 1C of the protrusion shape portion, the bottom portion 1B of the recess shape portion, the side portion 1C of the recess shape portion, the periphery of the protrusion shape portion, and the periphery of the recess shape portion.

With this configuration, it is possible to allow a set of various shapes and the pattern 11 to be viewed, so that it is possible to improve design quality of the protrusion shape portion and the recess shape portion.

The laser irradiation unit 20 is able to easily form the pattern 11 by forming the pattern 11 by laser irradiation.

The pattern 11 is formed of an aggregation of the dot portions 110, and the laser irradiation unit 20 forms the dot portions 110 by laser irradiation. With this configuration, it is possible to easily form the pattern 11 that has good visibility or that emphasizes the protrusion shape portion or the recess shape portion.

The laser irradiation unit 20 changes the focal point 30 of the laser by the beam expander 23. With this configuration, even at any of the protrusion shape portion, the recess shape portion, the periphery of the protrusion shape portion, and the periphery of the recess shape portion, it is possible to reduce variation in a laser beam diameter (spot diameter) at a position at which the pattern 11 is formed, so that it is possible to reduce variation in quality of the pattern 11.

The laser irradiation unit 20 changes intensity of the laser. With this configuration, even if the laser beam diameter (spot diameter) is increased due to deviation of the focal position of the laser, it is possible to reduce variation in laser irradiation energy per unit area by increasing the intensity of the laser light, so that it is possible to reduce variation in quality of the pattern.

The laser irradiation unit 20 changes a laser irradiation direction. With this configuration, even at the protrusion shape portion, the recess shape portion, the periphery of the protrusion shape portion, or the periphery of the recess shape portion, it is possible to reliably form the pattern.

The manufacturing apparatus 500 includes the stereo camera 26 as one example of a position detection unit that detects a position of the protrusion shape portion or the recess shape portion. With this configuration, it is possible to reliably form the pattern 11 on the protrusion shape portion, the recess shape portion, the periphery of the protrusion shape portion, or the periphery of the recess shape portion.

The manufacturing apparatus 500 includes the stereo camera 26 as one example of a distance detection unit that detects a distance to the protrusion shape portion or the recess shape portion. With this configuration, even at the protrusion shape portion, the recess shape portion, the periphery of the protrusion shape portion, or the periphery of the recess shape portion, it is possible to reduce variation in quality of the pattern 11 caused by variation in a laser light path length.

A method of forming a pattern on the base material according to one embodiment of the present invention includes a preparation step of preparing the base material on which a protrusion shape portion or a recess shape portion is formed, and a pattern formation step of forming the pattern 11 on at least one of the protrusion shape portion, the recess shape portion, a periphery of the protrusion shape portion, a periphery of the recess shape portion, a portion along the protrusion shape portion, and a portion along the recess shape portion.

The base material 1a of the container 1 according to one embodiment of the present invention is the base material 1a on which a protrusion shape portion or a recess shape portion is formed, and the pattern 11 is formed on at least one of the protrusion shape portion, the recess shape portion, a periphery of the protrusion shape portion, a periphery of the recess shape portion, a portion along the protrusion shape portion, and a portion along the recess shape portion. The pattern 11 is formed across two or more of a top portion of the protrusion shape portion, a side portion of the protrusion shape portion, a bottom portion of the recess shape portion, a side portion of the recess shape portion, the periphery of the protrusion shape portion, and the periphery of the recess shape portion. The protrusion shape portion and the recess shape portion are formed by embossing.

According to an embodiment, it is possible to provide a base material with good visibility and with good design quality.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

REFERENCE SIGNS LIST 1 container
1a base material
1b contents
1A top portion (one example of protrusion shape portion)
1B bottom portion (part of recess shape portion)

1C side portion (part of protrusion shape portion or recess shape portion)
1D reference surface
1E embossed portion (protrusion shape portion or recess shape portion)
2 cap
11 pattern
110 dot portion (one example of predetermined shape and dot)
111 recess (one example of predetermined recess)
1111 first inclined surface
1112 bottom portion
112 protrusion (one example of predetermined protrusion)
1121 top portion
1122 second inclined surface
113 asperity portion
12 non-pattern region (one example of second region)
13 pattern region (one example of first region)
20 laser irradiation unit (pattern forming unit)
21 laser light source
22 laser light
23 beam expander
24 scanning unit
25 scanning lens
26 stereo camera (one example of position detection unit and distance detection unit)
27 laser light
28 holding unit
29 holding plate
30 focal point
31, 32 spot diameter
300 first mounting unit
400 second mounting unit
500 manufacturing apparatus
A region
B perspective view
dp depth
Dc recess width
Dr torus width
h height
W dot width

What is claimed is:

1. A pattern forming apparatus for a base material, comprising:
a holder to hold the base material on which a protrusion shape portion and a recess shape portion are formed; and
a pattern former to form a pattern on the base material, wherein
the pattern former applies laser to form the pattern on all of a top portion of the protrusion shape portion, a bottom portion of the recess shape portion, and a side portion of the protrusion shape portion or the recess shape portion,
the side portion of the protrusion shape portion or the recess shape portion is located between the top portion of the protrusion shape portion and the bottom portion of the recess shape portion,
the side portion of the protrusion shape portion or the recess shape portion has a surface that is perpendicular to a surface of the top portion of the protrusion shape portion and a surface of the bottom portion of the recess shape portion, and
the pattern former applies the laser such that a laser focal position is located in a vicinity of the side portion of the protrusion shape portion or the recess shape portion.

2. The pattern forming apparatus according to claim 1, wherein:
the pattern comprises an aggregation of dots, and the pattern former forms the dots by laser irradiation.

3. The pattern forming apparatus according to claim 1, wherein:
the pattern former changes the laser focal position.

4. The pattern forming apparatus according to claim 3, wherein:
the pattern former changes an intensity of the laser.

5. The pattern forming apparatus according to claim 1, wherein:
the pattern former changes a laser irradiation direction.

6. The pattern forming apparatus according to claim 1, further comprising:
a position detector to detect a position of the protrusion shape portion and the recess shape portion.

7. The pattern forming apparatus according to claim 6, further comprising:
a distance detector to detect a distance to the protrusion shape portion and the recess shape portion.

8. The pattern forming apparatus according to claim 1, wherein:
the surface of the top portion of the protrusion shape portion and the surface of the bottom portion of the recess shape portion extend in planes that are parallel,
the base material further comprises an upper surface of the base material and a lower surface of the base material, and
the upper surface of the base material and the lower surface of the base material extend in planes that are parallel with the surface of the side portion of the protrusion shape portion or the recess shape portion.

9. The pattern forming apparatus according to claim 8, wherein:
the top portion of the protrusion shape portion, the bottom portion of the recess shape portion, and the side portion of the protrusion shape portion or the recess shape portion are all located between the upper surface of the base material and the lower surface of the base material.

10. The pattern forming apparatus according to claim 9, wherein:
the base material includes at least two sets of the top portion, the bottom portion, and the side portion respectively corresponding to, at least, a first top portion, a first bottom portion, a first side portion, a second top portion, a second bottom portion, and a second side portion.

11. A pattern forming method for a base material, comprising:
preparing the base material on which a protrusion shape portion and a recess shape portion are formed; and
forming a pattern on the base material by:
applying laser to form the pattern on all of a top portion of the protrusion shape portion, a bottom portion of the recess shape portion, and a side portion of the protrusion shape portion or the recess shape portion,
the side portion of the protrusion shape portion or the recess shape portion is located between the top portion of the protrusion shape portion and the bottom portion of the recess shape portion,
the side portion of the protrusion shape portion or the recess shape portion has a surface that is perpendicular to a surface of the top portion of the protrusion shape portion and a surface of the bottom portion of the recess shape portion, and applying the laser such that a laser focal position is located in a vicinity of the side portion of the protrusion shape portion or the recess shape portion.

12. The pattern forming method according to claim 11, wherein:

the surface of the top portion of the protrusion shape portion and the surface of the bottom portion of the recess shape portion extend in planes that are parallel, the base material further comprises an upper surface of the base material and a lower surface of the base material, and the upper surface of the base material and the lower surface of the base material extend in planes that are parallel with the surface of the side portion of the protrusion shape portion or the recess shape portion.

13. The pattern forming method according to claim 12, wherein:

the top portion of the protrusion shape portion, the bottom portion of the recess shape portion, and the side portion of the protrusion shape portion or the recess shape portion are all located between the upper surface of the base material and the lower surface of the base material.

14. The pattern forming method according to claim 13, wherein:

the base material includes at least two sets of the top portion, the bottom portion, and the side portion respectively corresponding to, at least, a first top portion, a first bottom portion, a first side portion, a second top portion, a second bottom portion, and a second side portion.

15. A base material on which a protrusion shape portion and a recess shape portion are formed, the base material comprising:

a pattern formed on the base material by:

applying laser to form the pattern on all of a top portion of the protrusion shape portion, a bottom portion of the recess shape portion, and a side portion of the protrusion shape portion or the recess shape portion, the side portion of the protrusion shape portion or the recess shape portion is located between the top portion of the protrusion shape portion and the bottom portion of the recess shape portion, the side portion of the protrusion shape portion or the recess shape portion has a surface that is perpendicular to a surface of the top portion of the protrusion shape portion and a surface of the bottom portion of the recess shape portion, and applying the laser such that a laser focal position is located in a vicinity of the side portion of the protrusion shape portion or the recess shape portion.

16. The base material according to claim 15, wherein:

the protrusion shape portion and the recess shape portion are formed by embossing.

17. A container comprising the base material according to claim 15.

18. The base material according to claim 15, wherein:

the surface of the top portion of the protrusion shape portion and the surface of the bottom portion of the recess shape portion extend in planes that are parallel, the base material further comprises an upper surface of the base material and a lower surface of the base material, and the upper surface of the base material and the lower surface of the base material extend in planes that are parallel with the surface of the side portion of the protrusion shape portion or the recess shape portion.

19. The base material according to claim 18, wherein:

the top portion of the protrusion shape portion, the bottom portion of the recess shape portion, and the side portion of the protrusion shape portion or the recess shape portion are all located between the upper surface of the base material and the lower surface of the base material.

20. The base material according to claim 19, wherein:

the base material includes at least two sets of the top portion, the bottom portion, and the side portion respectively corresponding to, at least, a first top portion, a first bottom portion, a first side portion, a second top portion, a second bottom portion, and a second side portion.

* * * * *